United States Patent [19]
Ayerst et al.

[11] Patent Number: 5,799,012
[45] Date of Patent: Aug. 25, 1998

[54] SYSTEM CONTROLLED ASYMMETRICAL AUTOMATIC REPEAT REQUEST PROTOCOL METHOD

[75] Inventors: Douglas I. Ayerst, Delray Beach, Fla.; Malik J. Khan, Elgin, Ill.; Michael J. Rudowicz, Delray Beach, Fla.

[73] Assignee: Motorola, Inc., Schaumburg, Ill.

[21] Appl. No.: 583,364

[22] Filed: Jan. 5, 1996

Related U.S. Application Data

[60] Provisional application No. 60/002,160, Aug. 11, 1995.
[51] Int. Cl.$^6$ .................................................. H04J 3/16
[52] U.S. Cl. .................. 370/336; 370/348; 370/349; 370/473; 455/509; 371/32
[58] Field of Search ................... 370/329, 345, 370/346, 347, 348, 449, 470, 471, 472, 473; 455/450, 452, 509, 513, 88; 371/32–34

[56] References Cited

U.S. PATENT DOCUMENTS

| | | | |
|---|---|---|---|
| 4,247,908 | 1/1981 | Lockhart, Jr. et al. | 364/900 |
| 4,670,906 | 6/1987 | Thro | 455/56 |
| 4,875,038 | 10/1989 | Siwiak et al. | 340/825.44 |
| 4,928,096 | 5/1990 | Leonardo et al. | 340/825.44 |
| 4,937,819 | 6/1990 | King | 370/442 |
| 5,124,697 | 6/1992 | Moore | 340/825.44 |
| 5,168,493 | 12/1992 | Nelson et al. | 370/84 |
| 5,172,375 | 12/1992 | Kou | 370/324 |
| 5,365,516 | 11/1994 | Jandrell et al. | 370/18 |
| 5,377,192 | 12/1994 | Leslie et al. | 370/348 |
| 5,390,339 | 2/1995 | Bruckert et al. | 455/33.2 |
| 5,515,379 | 5/1996 | Crisler et al. | 370/347 |

Primary Examiner—Hassan Kizou

[57] ABSTRACT

A two-way wireless selective call communication system (20) using a synchronous time division multiplex communication protocol transmits messages divided into a plurality of data units (120, 126, and 128) from a plurality of selective call transceivers (32) to a paging terminal (33) during time slots (78), the number of data units and the time slots are set by the paging terminal controller (26) based on information, including size of the message information, received in an unscheduled transmission from each of the plurality of selective call transceivers. The paging terminal transmits to a selective call transceiver a multi-bit acknowledgment message having a one-bit acknowledgment for each of the plurality of data units. A selective call transceiver re-transmits data units not recovered by the terminal based upon content of the acknowledgment message. More than one selective call transceiver transmit during a one time slot set by the terminal.

9 Claims, 16 Drawing Sheets

SYSTEM CONTROLLED ASYMMETRICAL AUTOMATIC REPEAT REQUEST PROTOCOL METHOD

RELATED APPLICATION

This application is related to, and applicants hereby claim the benefit of the prior filing date of, a co-pending provisional application entitled "System Controlled Asymmetrical ARQ Protocol for Reverse Channel Messaging", having application Ser. No. 60/002,160 and filed on Aug. 11, 1995 by the identical inventors as the inventors of the present application.

FIELD OF THE INVENTION

This invention relates in general to two-way radio communications and in particular to a protocol for handling erroneous information recovered from a radio signal received by a selective call transceiver with limited messaging capability.

BACKGROUND OF THE INVENTION

A known method of recovering erroneous information in a radio or wireless communication system is to request the re-transmission of erroneous data packets by acknowledging the successful or unsuccessful reception of each packet in a return transmission to the originator of the data packets. The return transmission contains explicit or implicit information about each of the received data packets and initiates a re-transmission of the erroneous packets to the message recipient. This known method of recovering erroneous message data is known as an automatic repeat request (ARQ) protocol. Two examples of ARQ protocols are "selective repeat", in which only specific, erroneous data fragments are re-transmitted, and "go back n", which initiates a re-transmission of all data fragments starting from the first incorrect fragment. Known ARQ methods require that both the sender and the recipient of the message data have equal transmission capability and operate independently of each other, exchanging message data and response information until the entire message has been processed. Disadvantageously, these known ARQ methods are not designed to operate on systems where the system control is one-sided, such as in a two-way paging system. In a two-way wireless selective call, or paging, system, a system controller at a fixed paging terminal is responsible for scheduling all of the transmissions for the selective call transceivers, including dictating when any ALOHA-style transmission can be made by a two-way pager, or transceiver. A typical two-way paging system, with limited reverse channel (i.e., transmission from two-way pager to paging system) messaging capability, requires that the portable selective call transceivers, transmit only when commanded to do so by the system controller.

Portable pagers, or selective call transceivers, operating in such a system, are limited in memory, processing power and, as a result of dependence upon limited battery power, the ability to perform numerous continuous transmissions. Since known ARQ methods require the capability to independently initiate and control transmissions from both the sender and recipient of message data, selective call transceivers are not able to support the transmission requirements necessary to complete ARQ transactions using known methods. Known ARQ methods require data storage, processing and transmission requirements beyond the capabilities of selective call transceivers. These limitations in the selective call transceivers make known ARQ methods unsuitable for use in a two-way paging system with limited inbound messaging capability where the transmission scheduling is provided solely by the system controller.

Known paging systems also lack the capability of efficiently assigning a plurality of two-way pagers to transmit during a same time slot because known systems either lack sufficient information about the location of the plurality of two-way pagers, or lack the capability to dictate that more than one two-way pager transmit at the same time, or lack both.

Thus what is needed is a message acknowledgment method and apparatus that requests automatic repeat of missing or erroneous information recovered from a radio signal from a selective call transceiver received at a paging system terminal via a reverse channel that minimizes delay caused by acknowledgments and that consumes minimal forward channel capacity.

DETAILED DESCRIPTION OF THE PREFERRED EMBODIMENT

Figure 1:
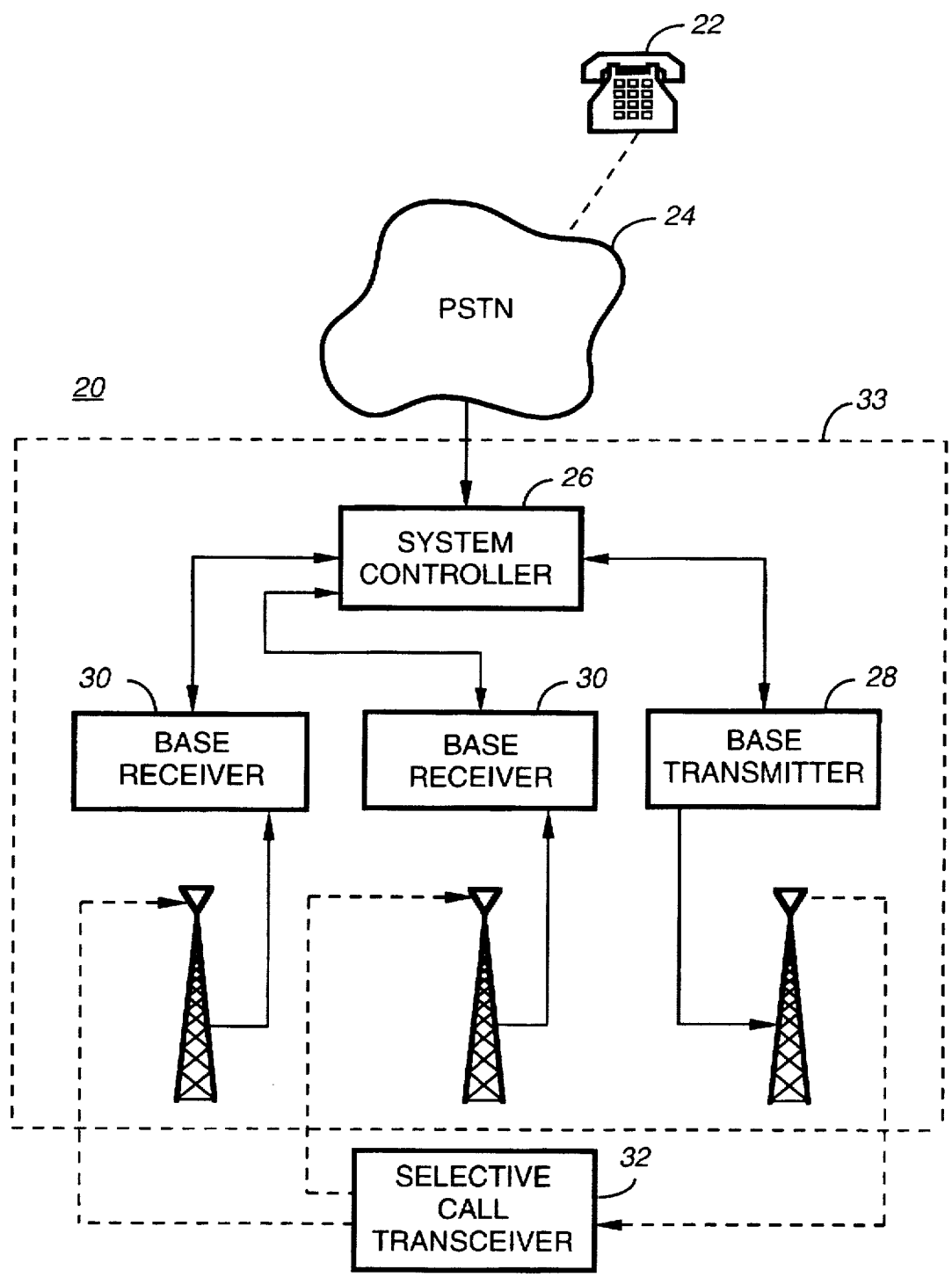
FIG. 1 is a block diagram of a two-way wireless selective call communication system in accordance with the preferred embodiment of the present invention.

Referring to FIG. 1, an electrical block diagram of a two-way wireless communication system, preferably a two-way wireless selective call communication system, or system, 20 is shown in accordance with the preferred embodiment of the present invention. The system 20 comprises a message input device, such as a conventional telephone 22, connected by a conventional public switched telephone network (PSTN) 24 to a system controller, or controller, 26. The controller 26 oversees the operation of at least one radio frequency transmitter 28 and a plurality of fixed radio frequency receivers, or receivers 30, and encodes and decodes inbound and outbound messages into formats that are compatible with land line message switches. The controller 26 also includes an encoder and a decoder and functions to encode and decode paging messages to and from selective call transceivers, or transceivers 32. The controller 26, the at least one radio frequency transmitter 28, and the plurality of fixed radio frequency receivers comprise a terminal 33 that is preferably fixed.

The system controller 26 queues data and stored messages for transmission to the selective call transceivers 32. A subscriber data base in the controller 26 stores information relevant to each subscriber's transceiver, including a correlation between the unique address assigned to each transceiver and the telephone number used within the PSTN 24 to route messages to each transceiver 32, as well as other subscriber determined preferences.

The system controller 26 schedules transmissions of messages and acknowledgments from the selective call transceivers 32, including portable selective call transceivers. These transmissions include demand type transmissions from the transceivers, such as acknowledgments to messages that have been transmitted by the controller 26 and responses to messages such as status inquiries transmitted from the controller 26. The scheduled transmissions can also include non-demand transmissions from the transceivers, such as messages being held by the transceivers, about which the transceivers have informed the controller 26 within a previous message or acknowledgment transmitted to the controller 26 by the transceiver. The use of reverse channel scheduling under certain circumstances improves the throughput of the reverse channel in comparison to that achievable for an unscheduled, random input reverse channel organization scheme such as that used in an ALOHA system, well known to one of ordinary skill in the art. As will be described in more detail below, a scheduled reverse channel is a portion of the total time available in a single radio channel frequency which is time shared for both forward and reverse channels. Alternatively, the scheduled reverse channel is some portion of the time available, or all the time available, in a second radio carrier frequency which is different from the forward channel radio frequency.

Figure 2:
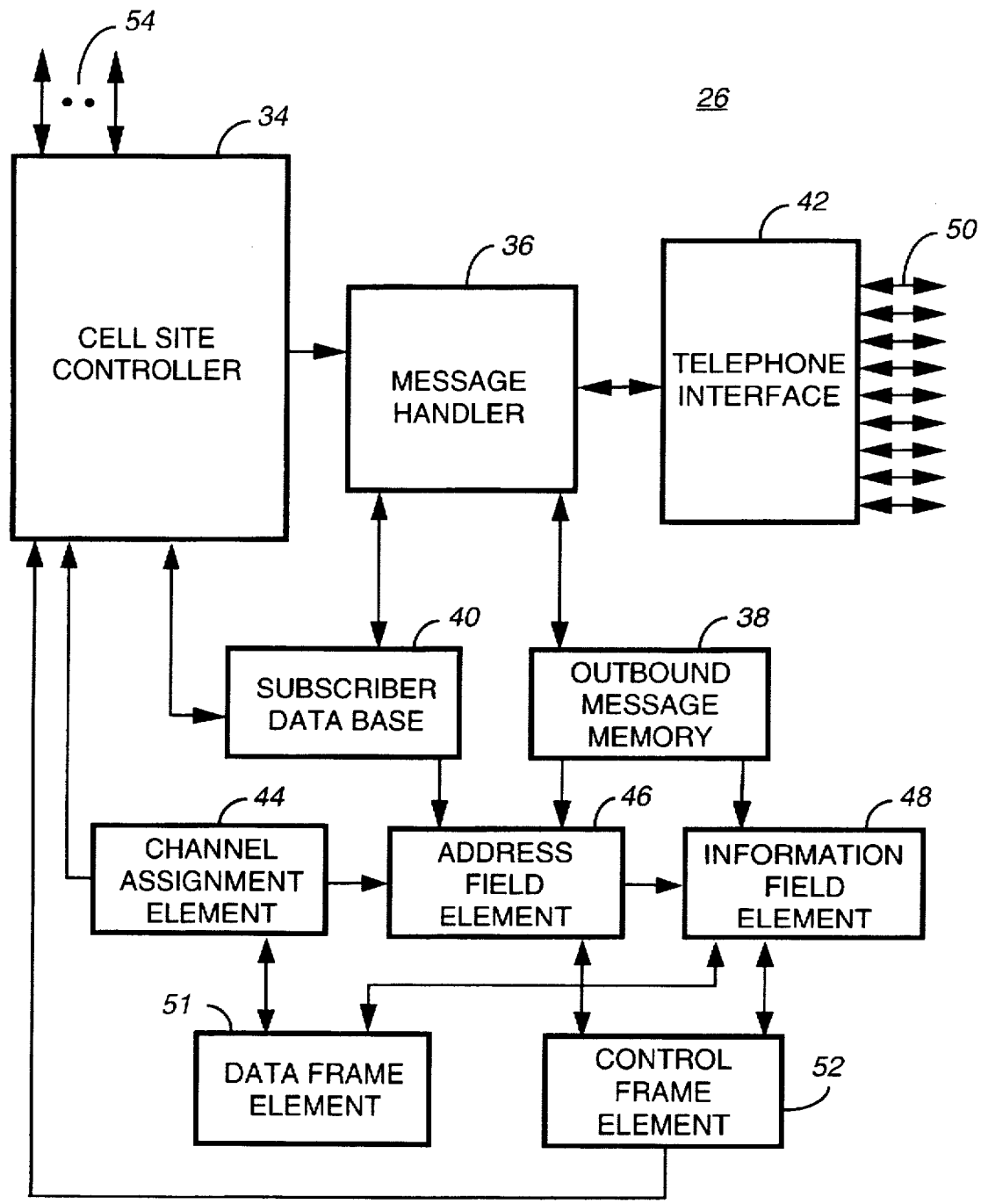
FIG. 2 is an electrical block diagram of the system controller used in the two-way wireless selective call communication system of FIG. 1.

Referring now to FIG. 2, the system controller 26 comprises a cell site controller 34, a message handler 36, an outbound message memory 38, a subscriber data base 40, a telephone interface 42, a channel assignment element 44, an address field element 46, an information field element 48, a data frame element 51, and a control frame element 52. The cell site controller 34 is coupled to the radio frequency transmitter 28 and receivers 30 (FIG. 1) by links 54. The cell site controller 34 couples outbound messages including selective call addresses to the transmitter and receivers and controls the transmitter and receivers to transmit protocol cycles that include the outbound messages. The cell site controller 34 also processes inbound messages from the transceivers 32. The inbound messages are received by the transmitter and a plurality of fixed receivers, and are coupled to the cell site controller 34. The message handler 36, which routes and processes messages, is coupled to the telephone interface 42, the subscriber data base 40, and the outbound message memory 38. The telephone interface 42 handles the switched telephone network 24 (PSTN) (FIG. 1) physical connection, connecting and disconnecting telephone calls at the telephone links 50, and routing the audio signals between the telephone links 50 and the message handler 36.

The subscriber data base 40 stores information for each subscriber, including a correlation between a selective call address assigned to each selective call transceiver 32 and the telephone number used within the PSTN 24 to route messages and telephone calls to each transceiver 32, as well as other subscriber determined preferences. The outbound message memory 38 is for storing a queue of messages which are queued for delivery to at least one of the plurality of transceivers 32, wherein each message of the queue of messages is associated with a selective call address, also stored in the outbound message memory 38, of one of the plurality of transceivers 32 for which each message is intended. The message handler 36 schedules outbound messages and the selective call addresses associated therewith within a transmission cycle. The message handler 36 also determines response schedules for response messages that minimize contention of messages at the transmitter and receivers, and includes response timing information in outbound messages so that transceivers 32 will respond according to the response schedule. The message handler 36 identifies an inbound message as being a response message associated with one of the transceivers in the subscriber data base 40, identifies the response message as being associated with one of the outbound messages in the outbound message memory 38. The message handler 36 then further processes the outbound and response messages according to their content. The cell site controller 34, the message handler 36, the outbound message memory 38, the subscriber data base 40, and the telephone interface 42, are conventional elements of the controller 26.

As one example of an operation of the system controller 26, the delivery of an outbound message stored in the outbound message memory 38 is completed when the outbound message has been communicated to the intended selective call transceiver 32, the message is presented on a display of the transceiver 32 by a user action, a message response is communicated back to the controller 26 from the transceiver 32, and the message response is identified by the message handler 36 as being a user acknowledgment generated by the transceiver 32 specifically for the outbound message. In this example, the message handler 36 generates another message that is sent to the originator of the outbound message to notify the originator that the message has been acknowledged by the transceiver 32.

The address field element 46 is coupled to the subscriber data base 40, the outbound message memory 38, the information field element 48, and the control frame element 52. The information field element 48 is further coupled to the outbound message memory 38 and the control frame element 52. The control frame element 52 is further coupled to the cell site controller 34. The channel assignment element 44 is coupled to the data frame element 51. The address field element 46 recovers messages from the outbound message memory 38 that have been scheduled for transmission in an upcoming transmission cycle. The address field element 46 determines, for each recovered message, the associated selective call address (from the subscriber data base 40) and the length of the message. The length of the message is coupled to the information field element 48.

When the message information is one of a set of predetermined short messages, for example an acknowledgment or a response command, or when the message information is less than a first predetermined length, which in the example herein below is three words long, the message is coupled by the information field element 48 to the control frame element 52 for inclusion as a short message packet into an information field of a control frame being assembled by the control frame element 52 at a starting position within the control frame. The control frame element 52 couples the starting position of the short message to the address field element 46, which generates a subvector associated with the selective call address and which indicates the starting position. The terms "vector" or "subvector" refer to a multi-bit field of data such as an acknowledgment vector of the invention which is wirelessly transmitted within a signal. The length of each short message which is in the set of predetermined short messages is indicated within each predetermined message, and is less than a second predetermined length, which in this example is nine words long. For example, short messages that command a transceiver 32 to perform an automatic repeat request are of variable length of from 4 to 8 words long depending on a number of predetermined length response data packets that the transceiver 32 is being commanded to re-transmit. The length of each short message which is not in the set of predetermined messages is included in each short message by the control frame element 52. The selective call address with the subvector is then coupled to the control frame element 52 and assembled by the control frame element 52 into an address field of the same control frame in which the short message packet is located.

When the message information is not one of the set of predetermined short messages, or has a length equal to or more than the first predetermined length, the message is coupled by the information field element 48 to the data frame element 51 for inclusion as a long message packet into an information field of a control frame or a data frame being assembled, respectively, by the control frame element 52 or the data frame element 51 at a starting position within the control frame or data frame. The control frame element 52 or data frame element 51 couples the starting position of the long message within the control or data frame and the length of the long message to the information field element 48, which generates a vector packet that is coupled to and included by the control frame element 52 in the information portion of the control frame. The vector, which is less than a third predetermined length, which in this example is less than six words long, indicates the starting position and the length of the long message. The control frame element 52 couples the starting position of the vector packet within the control frame to the address field element 46, which generates a subvector associated with the selective call address that indicates the starting position of the vector packet. The selective call address with the subvector is then assembled by the control frame element 52 into an address field of the same control frame which includes the vector packet.

When the system comprises more than one forward channel, as for example, in a system having three radio frequencies usable for simultaneous broadcasting of radio signals, the channel assignment element 44 schedules data frames for transmission on one of the plurality of forward channels. In this situation, the data frame element 51 couples to the information field element 48 an indication of which channel the data frame will be transmitted on as a part of the starting position of the long message, for inclusion in the vector packet generated by the control frame element 52.

It should be appreciated that for improved battery life in the selective call transceivers 32, selective call addresses for messages intended for a particular transceiver 32 are included in a control frame that is at a predetermined position of a transmission cycle, so that the transceiver 32 need only go into a normal power mode at the beginning of the predetermined control frame.

System controller 26 is preferably a model MPS2000® paging terminal manufactured by Motorola, Inc., of Schaumburg, Ill., modified with unique firmware or software elements in accordance with the preferred embodiment of the present invention, as described herein. The cell site controller 34, the message handler 36, the outbound message memory 38, the subscriber data base 40, the telephone interface 42, the channel assignment element 44, the address field element 46, the information field element 48, the data frame element 51, and the control frame element 52 are preferably implemented within portions of the model MPS2000® paging terminal which include, but are not limited to those portions providing program memory, a central processing unit, input/output peripherals, and a random access memory. The controller is alternatively implemented using a model E09PED0552 PageBridge® paging terminal manufactured by Motorola, Inc., of Schaumburg, Ill. The subscriber data base 40 and the outbound message memory 38 is alternatively implemented as magnetic or optical disk memory, which can alternatively be external to the controller 26.

The system controller 26 is preferably a model E09PED0552 PageBridge® paging terminal manufactured by Motorola, Inc., of Schaumburg, Ill., modified with special firmware or software elements in accordance with the preferred embodiments of the present invention, as described herein. The controller alternatively could be implemented using a MPS2000® paging terminal manufactured by Motorola, Inc., of Schaumburg, Ill. The subscriber data base is alternatively implemented as magnetic or optical disk memory.

The receiver 30 preferably comprises a Nucleus® model receiver manufactured by Motorola, Inc. of Schaumburg, Ill., with unique functions added to the standard model. The unique functions are provided by firmware or software routines developed in accordance with techniques well known to persons skilled in the art.

The receiver 30 operates in a first type or a second type of system. In the first type of system, a first radio carrier frequency is time shared by a forward channel, which is for transmitting information from the transmitter in a forward channel radio signal to one or more identified transceivers, and a reverse channel, which is for transmitting scheduled responses from the identified transceivers in reverse channel radio signals to the receivers. The antenna intercepts the forward channel radio signal, which includes telephony signals, digital messages, and commands.

In the second type of system, the forward radio channel and reverse radio channel are at two different radio frequencies, and the transmitter transmits the commands in two radio signals: a forward channel radio signal having a first radio carrier frequency which is a forward channel radio frequency and a reverse channel radio signal having a second radio carrier frequency which is a reverse channel radio frequency, although the forward and reverse transmissions of the commands are not necessarily simultaneous. Thus, in the system of the first and second types, only one frequency need be received to recover the commands and the scheduled responses, which are used to generate the control signal and perform the tests of the responses, because the commands are transmitted at the same frequency as the scheduled responses.

Inbound messages are transmitted by the selective call transceivers 32 at a base, or default, inbound data rate. The base inbound data rate is one of a group of predetermined inbound data rates. Examples of data rates used herein are 1600, 6400, or 9600 bits per second (bps). Each of the group of predetermined inbound data rates is associated with a respective predetermined modulation method. The cell site controller 34 receives a signal quality indicator with each inbound message received via the receivers from subscriber data base 40. The signal quality indicator is determined by a received signal strength indication circuit (RSSI) in the receiver 30 during the reception of the message, in a manner well known to persons skilled in the art. Alternative techniques for determining signal quality that are also well known to persons skilled in the art, such as a bit error rate of a signal which includes error detecting bits, can be used equally as well. The cell site controller 34 is coupled to the subscriber data base 40 and stores the signal quality indicator and the time at which it was received in the subscriber data base in the association with the transceiver 32. The cell site controller 34 also uses the value of the signal quality indicator as well as the values and ages of signal quality indicators obtained from prior inbound messages stored in association with the transceiver 32 to determine an update to an optimum inbound data rate which is stored in the subscriber data base 40 in association with the transceiver 32. The optimum inbound data rate is also selected from the group of inbound data rates.

The base inbound data rate is selected, for example, at the time of system installation, in order to optimize characteristics of the system such as cost and coverage using other characteristics such as the number of transmitters and receivers in the system as well. The base inbound data rate is included in a portion of the outbound radio signal that is decoded by all selective call transceivers receiving outbound messages during the transmission cycle, and is used by default in every inbound message transmitted by the transceivers 32. However, the optimum inbound data rate is also used in at least some portion of some inbound messages, as described in more detail below. It will be appreciated that the optimum inbound data rate for a given transceiver is, in many instances, greater than the base inbound data rate. When an outbound message is likely to result in an inbound message of a minimum predetermined length, the cell site controller 34 includes in the outbound message the optimum inbound data rate associated with the transceiver for which the outbound message is intended, which is a unique aspect of the present invention. For example, the optimum inbound data rate for the preferred group of predetermined inbound data rates can be conveyed using two bits in the outbound message, when the preferred group of predetermined inbound data rates consists of four data rates.

The cell site controller 34 is further coupled to a receiver data base for storing therein a state of a synchronization mode for each receiver 30 controlled by the controller 26. As described herein, below, each receiver 30 is in one of two modes: synchronous or asynchronous. The receivers of the first type are always in the asynchronous mode. The receivers of the second type are normally in the synchronous mode, but may fall back to the asynchronous mode, for example, when a failure occurs in a synchronizing portion of the receiver. Such a fall back is reported to the cell site controller 34 by the receiver.

The cell site controller 34 further stores in the subscriber data base a receiver location associated with each selective call transceiver 32. The location associated with each transceiver 32 identifies a receiver 30 which is determined to be the most likely receiver to receive the next inbound messages from the transceiver 32. The location is determined when a prior response is received from the transceiver within a predetermined time limit with a predetermined minimum signal quality level. When multiple copies of a response message are received from a transceiver 32 from multiple receivers 30, the location is determined by the receiver 30 which indicates the highest signal quality for a most recently received wireless transmissions from each of a plurality of portable selective call transceivers. When an outbound message for a transceiver 32 is expected to result in a response message, such as an acknowledgment or a designated response message, the cell site controller 34 recovers from the receiver data base the synchronous mode of the receiver 30 associated by the location in the subscriber data base 40 with the transceiver 32 and includes a preamble indicator which identifies the synchronous mode of the receiver in the outbound message. When no signal quality level of sufficient level has been received within the predetermined time from a transceiver 32, the asynchronous mode is indicated by the preamble indicator in the outbound message.

Figure 3:
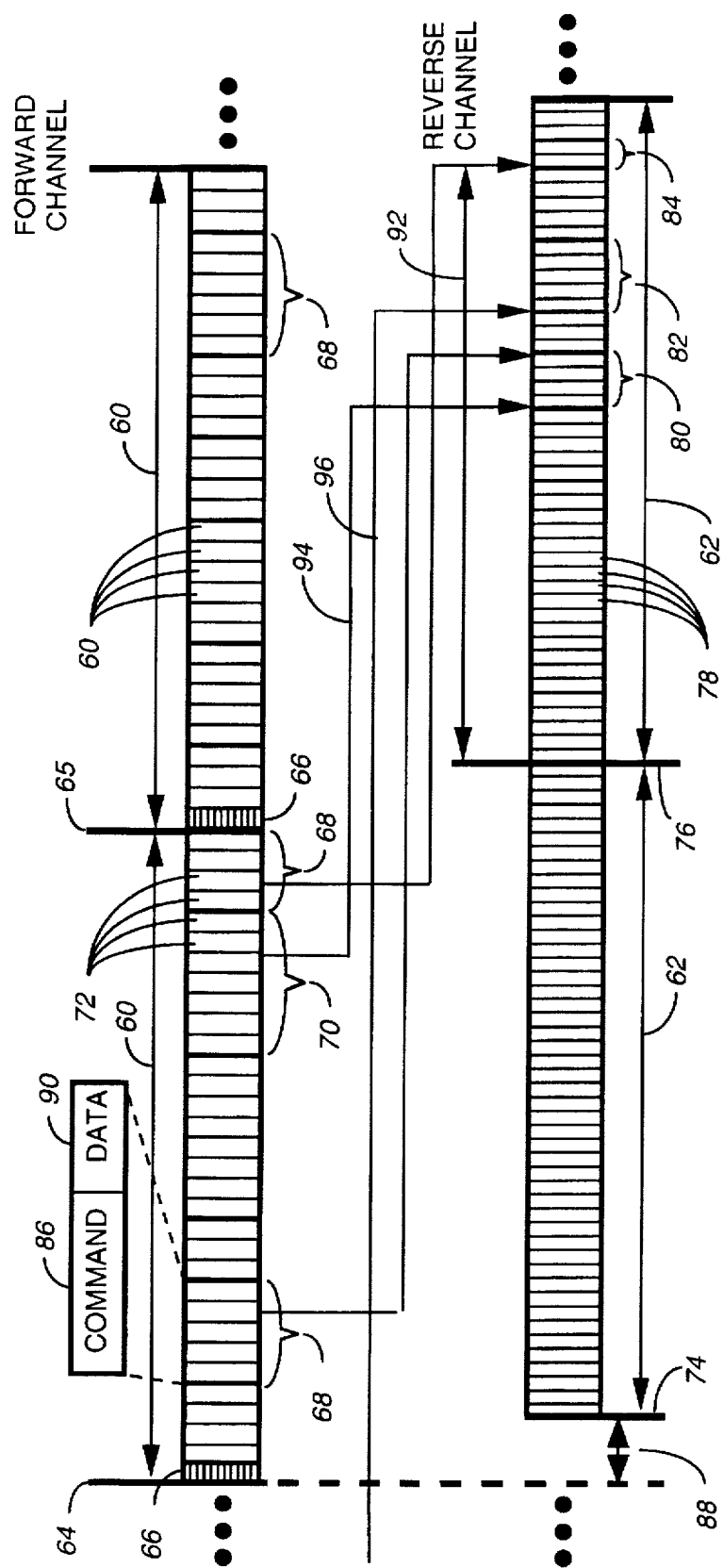
FIG. 3 is a timing diagram showing forward and reverse channel radio signals for the two-way wireless selective call communication system of FIG. 1.

Referring to FIG. 3, a timing diagram shows forward and reverse channel radio signals for the system 20. The forward channel radio signal, which is transmitted during a forward channel frame 60, is at a first radio carrier frequency. The reverse channel radio signals, which are transmitted during a reverse channel frame 62, are at a second radio carrier frequency.

The forward channel frame 60 duration is from a forward channel frame boundary 64 to a next forward channel frame boundary 65 during which transmissions of a forward channel radio signal are made from the transmitter to one or more of the identified selective call transceivers in the first type of system 20. The forward channel frame boundaries are preferably transmitted at regular intervals of 1.875 seconds and referenced to a first frame boundary of a first transmission cycle occurring accurately at the beginning of each hour, wherein the beginning of each hour is established using a standard time base. Alternative frame durations are alternatively used equally as well. The forward channel radio signal comprises one or more sequential radio signals transmitted from the transmitter. A forward channel frame synchronization and information portion 66 and a plurality of outbound forward messages 68 and 70 are transmitted within the forward channel radio signal by the transmitter. The plurality of outbound messages are each made up of a plurality of data words 72 of equal duration which are transmitted using an outbound data rate and associated modulation scheme typically predetermined for the forward channel. The outbound data rate is 1600, 3200, or 6400 bits per second (bps), and the modulation scheme is two or four level FM. A reverse channel frame 62 duration is from a reverse channel frame boundary 74 to a next reverse channel frame boundary 76 and includes a plurality of predetermined reverse channel time slots 78 of equal duration that are transmitted using a default, or base inbound data rate and associated modulation scheme. Response messages are transmitted as a plurality of data units 80, 82 and 84, each data unit comprising a plurality of data symbols and extending over one or more reverse channel time slots 78. One response message includes one or more such data units. Each of the data units 80, 82 and 84 is a radio signal transmitted from one of the identified transceivers in response to a command 86 that is received in one of the outbound forward messages 68 and 70.

Each frame synchronization and information portion 66 contains a frame synchronization pattern that marks the forward channel frame boundaries 64 and 65, establishes data symbol (data rate) synchronization, and includes information describing the reverse channel offset 88 to the reverse channel frame boundary 74, as a number of reverse channel time slots 78. The start time of each outbound forward message 68 and 70 is defined relative to the forward channel frame boundary 64, for example, by a word number. A command 86 is included in one or more of the outbound forward messages 68 and 70 by the controller 26, identifying one of the selective call transceivers by the selective call address associated with the transceiver in the subscriber data base 40 (FIG. 2), as well as a scheduled response time at which the identified transceiver is to begin transmitting a data unit in a reverse channel radio signal. The command 86 includes a designated length of the data unit, as a number of reverse channel time slots 78. The outbound forward messages 68 and 70 also may include data 90, such as an alphanumeric information message. The start time of each data unit 80, 82 and 84 is scheduled relative to the next reverse channel frame boundary 76, as, for example, data unit 84 which is scheduled at a time slot starting after the time slots included in an offset 92.

Synchronization of the forward channel frame 60, reverse channel frame 62, data word, or word 72, data symbol, reverse channel offset 88, and reverse channel time slot 78 required by the selective call transceivers 32 in the system 20 for both receiving on the forward channel frame and transmitting on the reverse channel frame 62 is determined from the forward channel frame synchronization and information portion 66. When a transceiver 32 receives the forward channel radio signal, the transceiver 32 processes the outbound forward message 68 and 70 included in the forward channel radio signal when the outbound forward message 68 and 70 includes the selective call address of the transceiver 32. When a command 86 is received by a transceiver 32 that is a response command, the transceiver 32 having the selective call address associated with the response command transmits, for example, one of the scheduled data units 80, 82 and 84 having a designated data unit length at the scheduled response time commanded by the controller 26 in the command 86. Correspondence between the command 86 received by identified transceivers in the outbound forward messages 68 and 70 and the scheduled data units 80, 82 and 84 from the transceivers 32 is indicated in FIG. 3 by arrowed lines from outbound messages 68 and 70 to the scheduled data units 80, 82 and 84, of which an example is line 94, which connects from a command 86 completed in forward message 70 to scheduled response consisting of data unit 80. Another example is line 96, which connects from a command (not shown in FIG. 3 and which is completed in an earlier forward channel frame than the forward channel frames 60 shown in FIG. 3) to the reverse channel frame shown in FIG. 3.

Each data unit 80, 82 and 84 transmitted from a selective call transceiver 32 is completely self contained in that it includes all of the information required by the receiver 30 to detect and decode the scheduled data unit 80, 82 and 84. That is, each scheduled data unit 80, 82 and 84 includes a synchronization pattern for demodulation and decoding, of the data unit, the transceiver's unique address, and information conveying the transmitted data unit length. Each data unit begins with a first portion that is transmitted at the base inbound data rate, and ends with a second portion that is transmitted at the optimum inbound data rate (it will be appreciated that the optimum inbound data rate can be equivalent to the base inbound data rate).

The system controller 26 is responsible for scheduling the forward and reverse channel messaging in the system 20. The controller receives the forward channel message data through the PSTN. The controller generates the forward channel data according to the formatting rules specified by a time-synchronous paging protocol such as the ReFlex50 paging protocol, which is a synchronous time division multiplex two-way wireless communication system protocol, and relays the forward channel message data to base transmitters that transmit the forward channel data over the air to the selective call transceivers. The controller also receives the reverse channel messaging data through its connections to the receivers. The receivers 30 receive the over-the-air reverse channel transmissions from the portable transceivers and send the received data to the controller for processing. The receivers are synchronous with the forward channel transmissions generated by the controller in order to effectively monitor the reverse channel(s) for incoming transmissions from transceivers. The base transmitters receive the formatted forward channel data from the controller and transmit the data over the air to the transceivers. The transceivers are small portable messaging units (PMUs) containing limited memory and processing power. These units are dependent on the controller for access to the scheduled portion of the reverse channel. The transceivers remain synchronous with the forward channel transmissions and decode the forward channel data to determine the characteristics of the reverse channel. These units are capable of transmitting complete or fragmented messages on the reverse channel when commanded to do so by the controller. Transmissions from transceivers are received by the receivers.

The time synchronous protocol used for forward and reverse channel messaging in the system 20 specifies that the data be formatted in frames, each 1.875 seconds in duration. One cycle of frames is composed of 128 frames and has a 4 minute transmission time. There are 15 cycles of frames transmitted on the forward channel each hour.

A more detailed description of the components of the system 20 and their operation as well as a detailed description of the two-way paging protocol functionality, are described in the following four U.S. patents and the following four U.S. patent applications, all of which are assigned to the assignee of the present invention, and all of which are hereby incorporated by reference herein: U.S. Pat. No.

4,875,038 issued Oct. 17, 1989 to Siwiak et al., entitled "Frequency Division Multiplexed Acknowledge Back Paging System"; U.S. Pat. No. 4,928,096 issued May 22, 1990 to Leonardo et al., entitled "Paging Terminal Apparatus with Message Storage and Retransmission Capability and Method Therefor"; U.S. Pat. No. 5,168,493 issued Dec. 1, 1992 to Nelson et al., entitled "Time Division Multiplexed Selective Call System"; U.S. Pat. No. 5,390,339 issued Feb. 14, 1995 to Bruckert et al., entitled "Method and Apparatus for Selecting a Serving Transceiver"; application having Ser. No. 08/404,698, filed Mar. 15, 1995 by Ayerst et al., entitled "Method and Apparatus for Organizing and Recovering Information Communicated in a Radio Communication System"; application having Ser. No. 08/283,369, filed Aug. 1, 1994 by Ayerst et al., entitled "Method and Apparatus for Improved Message Reception at a Fixed System Receiver"; application having Ser. No. 08/398,263, filed Mar. 3, 1995 by Budnik et al., entitled "Method and Apparatus for Optimizing a Data Rate in a Radio Communication System"; and application having Ser. No. 08/398,274, filed Mar. 3, 1995 by Ayerst et al., entitled "Method and Apparatus for Optimizing Receiver Synchronization in a Radio Communication System".

Figure 4:
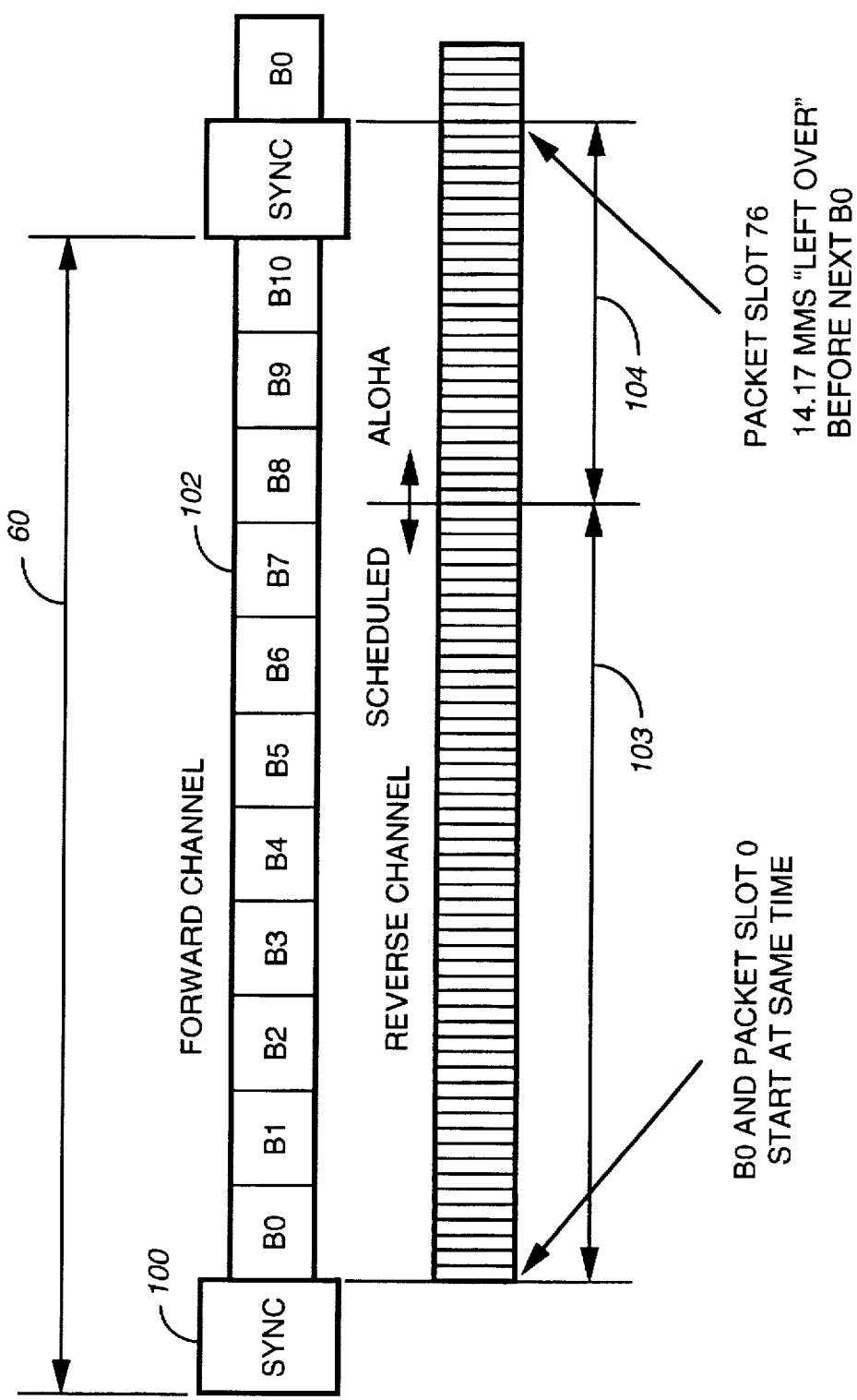
FIG. 4 is a representation of a frame on the forward channel of the two-way wireless selective call communication system showing data blocks.

As shown in FIG. 4, each of the data frames 60 sent on the forward channel is composed of a synchronization portion 100 (115 ms in duration), and 11 data blocks 102 (each 160 ms in duration). The data blocks 102 contain the forward channel data separated into block information, address, vector and message data fields. The reverse channel used for inbound messaging to the system controller is time synchronous with the forward channel and is composed of transmission time slots 78 (each approximately 16.04 ms in duration at 9600 bps). A single frame time of 1.875 seconds contains some number of transmission time slots in the range of 0–115. The number of time slots 78 per a frame 60 depends on whether the system 20 is operating in a time division duplex (TDD) mode or a frequency division duplex (FDD) mode. A portion 103 of the reverse channel slot range is designated as the scheduled transmission portion and the remaining portion 104 of the transmission time slots is designated as the unscheduled or slotted ALOHA portion. The controller assigns transmission time slots to the transceivers via forward channel vector field data.

Figure 5:
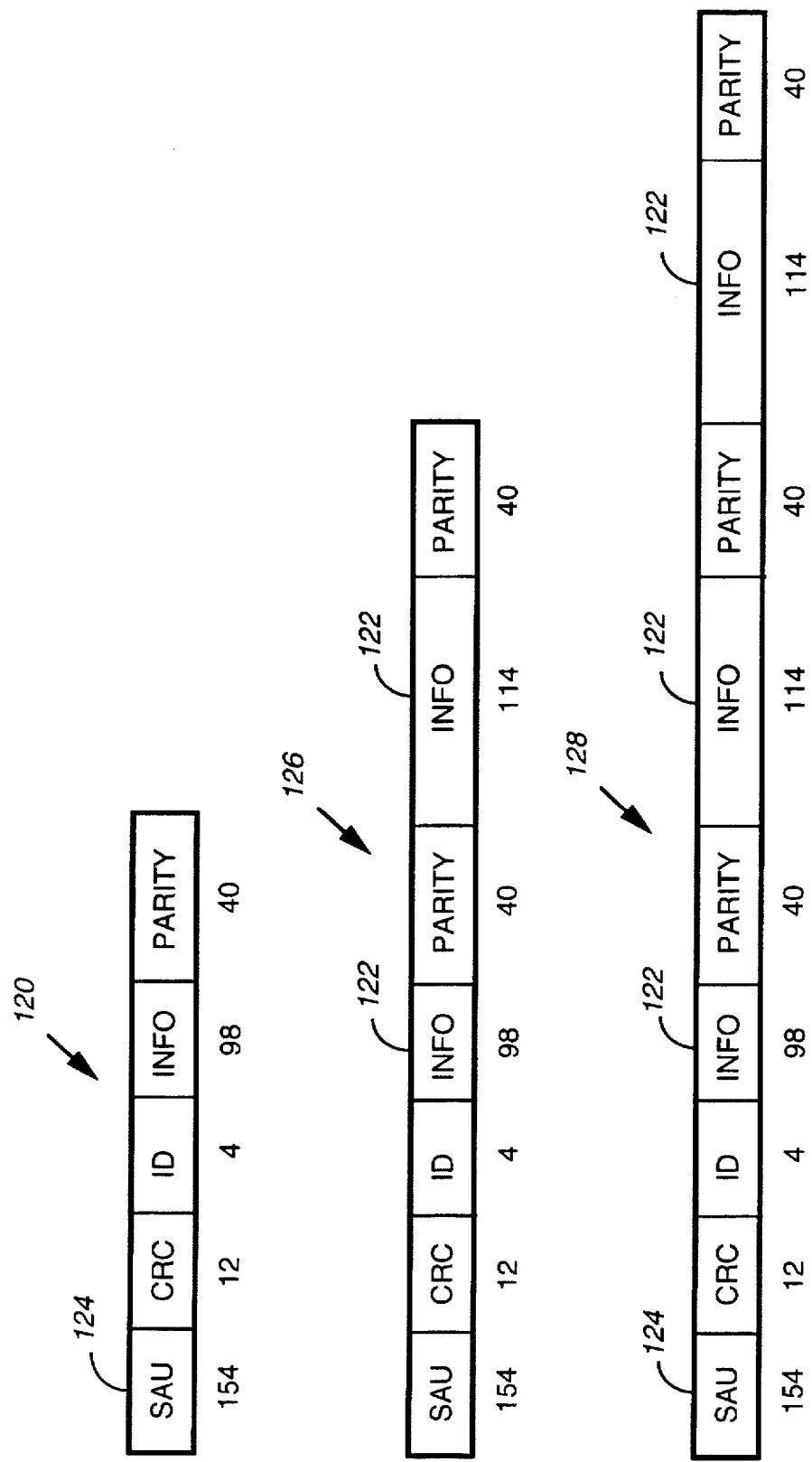
FIG. 5 is a diagrammatic representation of various size data units within the data blocks shown in FIG. 4.

Referring now to FIG. 5, reverse channel transmissions from the selective call transceivers are in the form of data units (DUs). A data unit is a parcel of scheduled transmitted data that is acknowledged by the system. A data unit or sequence of data units must always be preceded by a Start Address Unit. Within any data unit is one 12 bit CRC that is used for detecting errors. The data unit is made up of some integer number of packets. This number is variable and is determined by the scheduler at the start of the first transmissions. Once a message has been assigned a data unit length (in terms of packets per data unit) the length cannot change for the duration of the message transmission. Each data unit is assigned an ID number that is used in the ARQ process. The structure of a single packet is shown in Table 1. Alternatively, multiple packet data units 126 and 128 are used as shown in FIG. 5. A transceiver transmission consists of either a single data unit 120 preceded by a Start Address Unit 124 (SAU) or, alternatively, of a number of consecutive data units 122 preceded by a Start Address Unit 124. Each DU is comprised of either a single transmission time slot or, alternatively, of multiple transmission time slots. The SAU contains header information and the additional DUs that follow the SAU contain message data. See Table 1 for a representation of the bits within a single data unit.

TABLE 1

| Single Packet Data Unit (Standard Type) | | | | | | | | | | | | | |
| --- | --- | --- | --- | --- | --- | --- | --- | --- | --- | --- | --- | --- | --- |
| ID Bits (1 → 4) | | | | Information Bits (5 → 26) | | | | | | | | | |
| 1 | 2 | 3 | 4 | 5 | 6 | 7 | 8 | 9 | 10 | 11 | 12 | 13 | 14 |
| $d_3$ | $d_2$ | $d_1$ | $d_0$ | $i_M$ | i | i | i | i | i | i | i | i | i |
| Information Bits (5 → 26) | | | | | | | | | | | | | |
| 15 | 16 | 17 | 18 | 19 | 20 | 21 | 22 | 23 | 24 | 25 | 26 | | |
| i | i | i | i | i | i | i | i | i | i | i | i | | |
| Information Bits (27 → 50) | | | | | | | | | | | | | |
| 27 | 28 | 29 | 30 | 31 | 32 | 33 | 34 | 35 | 36 | 37 | 38 | 39 | 40 |
| i | i | i | i | i | i | i | i | i | i | i | i | i | i |
| 41 | 42 | 43 | 44 | 45 | 46 | 47 | 48 | 49 | 50 | | | | |
| i | i | i | i | i | i | i | i | i | i | | | | |
| Information Bits (51 → 76) | | | | | | | | | | | | | |
| 51 | 52 | 53 | 54 | 55 | 56 | 57 | 58 | 59 | 60 | 61 | 62 | 63 | 64 |
| i | i | i | i | i | i | i | i | i | i | i | i | i | i |
| 65 | 66 | 67 | 68 | 69 | 70 | 71 | 72 | 73 | 74 | 75 | 76 | | |

TABLE 1-continued

Single Packet Data Unit (Standard Type)

| i | i | i | i | i | i | i | i | i | i | i | i | | |
|---|---|---|---|---|---|---|---|---|---|---|---|---|---|

Information Bits (77 → 102)

| 77 | 78 | 79 | 80 | 81 | 82 | 83 | 84 | 85 | 86 | 87 | 88 | 89 | 90 |
|---|---|---|---|---|---|---|---|---|---|---|---|---|---|
| i | i | i | i | i | i | i | i | i | i | i | i | i | i |
| 91 | 92 | 93 | 94 | 95 | 96 | 97 | 98 | 99 | 100 | 101 | 102 | | |
| i | i | i | i | i | i | i | i | i | i | i | $i_L$ | | |

CRC-12 Bits (103 → 114)

| 103 | 104 | 105 | 106 | 107 | 108 | 109 | 110 | 111 | 112 | 113 | 114 |
|---|---|---|---|---|---|---|---|---|---|---|---|
| $c_{11}$ | $c_{10}$ | $c_9$ | $c_8$ | $c_7$ | $c_6$ | $c_5$ | $c_4$ | $c_3$ | $c_2$ | $c_1$ | $c_0$ |

Reed-Solomon Parity Bits (115 → 128)

| 115 | 116 | 117 | 118 | 119 | 120 | 121 | 122 | 123 | 124 | 125 | 126 | 127 | 128 |
|---|---|---|---|---|---|---|---|---|---|---|---|---|---|
| p | p | p | p | p | p | p | p | p | p | p | p | p | p |

Reed-Solomon Parity Bits (129 → 154)

| 129 | 130 | 131 | 132 | 133 | 134 | 135 | 136 | 137 | 138 | 139 | 140 | 141 | 142 |
|---|---|---|---|---|---|---|---|---|---|---|---|---|---|
| p | p | p | p | p | p | p | p | p | p | p | p | p | p |
| 143 | 144 | 145 | 146 | 147 | 148 | 149 | 150 | 151 | 152 | 153 | 154 | | |
| p | p | p | p | p | p | p | p | p | p | p | p | | | d - DU Identification Number (ID)
i - Information Bits, where $i_L$ is the least significant bit and $i_M$ is the most significant bit
c - CRC-12 Bits
p - Parity Bits obtained from the shortened version of the Reed-Solomon (31, 23) code
$p_e$ - Parity Bit chosen such that the arithmetic sum of the previous 5 bits with this bit is even The ARQ scheme of the invention for reverse channel messages provides for reliable and efficient reverse channel message delivery. This scheme is different from conventional sliding window ARQ protocols in which the transmit and receive sides act independently. In the preferred embodiment of the invention, the controller has complete control over when to schedule the reverse channel transmissions and when to acknowledge their receipt, once it has determined that a particular transceiver wants to send a message. The ARQ scheme enables the controller, also known as a Network Operations Center (NOC), to command re-transmission of messages received with errors and to recover from loss of transmissions on the forward or reverse channels. The ARQ scheme enables the system 20 to ask for re-transmission of messages received with errors and to recover from loss of transmissions on the forward or reverse channels.

The transceiver initiates one or more scheduled transmissions by first transmitting a "Reservation Request" ALOHA packet to the terminal 33 in the slotted ALOHA portion of the reverse channel (see FIG. 4). See Table 2 for a representation of the bits within the Reservation Request vector.

TABLE 2

| Packet Type | Reservation Request Vector | | | | | | | | | | | | | | |
|---|---|---|---|---|---|---|---|---|---|---|---|---|---|---|---|
| | $D_{14}$ | $D_{13}$ | $D_{12}$ | $D_{11}$ | $D_{10}$ | $D_9$ | $D_8$ | $D_7$ | $D_6$ | $D_5$ | $D_4$ | $D_3$ | $D_2$ | $D_1$ | $D_0$ |
| Reservation Request | 0 | 0 | 0 | 1 | $l_{10}$ | $l_9$ | $l_8$ | $l_7$ | $l_6$ | $l_5$ | $l_4$ | $l_3$ | $l_2$ | $l_1$ | $l_0$ | l - Length of Message Reservation in Bytes (1-2048)
$l_{10}l_9l_8 \ldots l_1l_0$
0 0 0 ... 0 0 --> 1 byte
0 0 0 ... 0 1 --> 2 bytes
1 1 1 ... 1 1 --> 2048 bytes Alternatively, for messages larger than 2048 bits, a Long Reservation Request vector is transmitted by the transceiver. See Table 3 for a representation of the bits within a Long Reservation Request vector.

TABLE 3

| | Long Reservation Request Vector | | | | | | | | | | | | | | |
|---|---|---|---|---|---|---|---|---|---|---|---|---|---|---|---|
| Packet Type | $D_{14}$ | $D_{13}$ | $D_{12}$ | $D_{11}$ | $D_{10}$ | $D_9$ | $D_8$ | $D_7$ | $D_6$ | $D_5$ | $D_4$ | $D_3$ | $D_2$ | $D_1$ | $D_0$ |
| Long Res. Request | 0 | 0 | 1 | 0 | $k_{10}$ | $k_9$ | $k_8$ | $k_7$ | $k_6$ | $k_5$ | $k_4$ | $k_3$ | $k_2$ | $k_1$ | $k_0$ | k - Length of Message Reservation in Bytes (2048 + 8*k ($k_{10}k_9k_8 \ldots k_1k_0$))
0 0 0 ... 0 0 --> 2048 + 8*1 bytes
0 0 0 ... 0 1 --> 2048 + 8*2 bytes
1 1 1 ... 1 0 --> 2048 + 8*2047 bytes
1 1 1 ... 1 1 --> Request for grant longer than 18424 bytes. It is up to the implemented application layer to inform the system controller of the exact size of the message.

Both types of Reservation Request vectors include at least a numeric measure of the length of the message. Upon receiving either a Reservation Request or a Long Reservation Request transmission, the controller determines the size of the message as well as the approximate location of the selective call transceiver that is originating the message with regard to the nearest receiver(s). Alternatively, the controller determines the approximate location of the transceiver through a last previous Registration and Location Query Packet transmitted by the transceiver. See Table 4 for a representation of the bits within a Registration and Location Query Packet. The Registration and Location Query Packet is transmitted when the transceiver changes zones in which it is located.

All selective call transceiver transmissions on the reverse channel are completely self contained in identifying the originator's address, signature, length of transmission, etc. The controller can therefore command two or more transceivers to transmit at the same or overlapping times within the same forward channel simulcast zone (thus allowing reverse channel frequency reuse), and the receivers will be able to resolve the different users provided that each user captures a different receiver.

The controller responds to the "Reservation Request" by sending a "Grant of Reverse Channel Reservation" vector to the transceiver on the forward channel. The Grant of Reverse Channel Reservation vector is used to indicate the start time and duration of a scheduled reverse channel

TABLE 4

| | Registration and Location Query Packet | | | | | | | | | | | | | | |
|---|---|---|---|---|---|---|---|---|---|---|---|---|---|---|---|
| Packet Type | $D_{14}$ | $D_{13}$ | $D_{12}$ | $D_{11}$ | $D_{10}$ | $D_9$ | $D_8$ | $D_7$ | $D_6$ | $D_5$ | $D_4$ | $D_3$ | $D_2$ | $D_1$ | $D_0$ |
| Reg. & Loc. Query | 0 | 1 | 1 | 0 | r | r | r | $z_7$ | $z_6$ | $z_5$ | $z_4$ | $z_3$ | $z_2$ | $z_1$ | $z_0$ | z - Zone Definition Bits (LSBs) received in forward channel Block Information Word Format Type $f_3 f_2 f_1 f_0$ = 1110. Used when Registering into a new forward channel zone or in response to a Location Query.

The location information is then used by the system controller to plan frequency reuse for simultaneous reverse channel transmissions from various selective call transceivers. This is accomplished by the controller determining the approximate geographic location of the transceivers and assigning the same transmission time slots to several transceivers provided that they are far enough apart so that they would not interfere with each other. This novel aspect of the invention is described in more detail herein below.

If the system controller initiates the selective call transceiver transmission, the location information can be obtained from the "Registration and Location Query Response" ALOHA packet (see Table 4) which the transceiver transmits in response to a "Location Query" command sent in the "Command To PMU" vector. In either case, as the transceiver makes scheduled transmissions when commanded by the controller, the transceiver's location can be updated, allowing the controller to maintain the most recent information for frequency reuse considerations.

transmission. The system provides transceiver access to the scheduled portion of the reverse channel through this vector. See Table 5 for a description of the bits within the Grant of Reverse Channel Reservation vector.

TABLE 5

Grant of Reverse Channel Reservation

| Bit Position | | | | | | | | | | | | | | | | | | | | | |
|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | |
| | | | | | | | | | Information | | | | | | | | | | | | |
| $x_0$ | $x_1$ | $x_2$ | $x_3$ | $V_0$ | $V_1$ | $V_2$ | $V_3$ | $S_0$ | $S_1$ | $S_2$ | $S_3$ | $S_4$ | $S_5$ | $S_6$ | $a_0$ | $a_1$ | $a_2$ | $w_0$ | $w_1$ | $w_2$ | |
| $x_0$ | $x_1$ | $x_2$ | $x_3$ | $f_0$ | $f_1$ | $f_2$ | $f_3$ | $f_4$ | $f_5$ | $p_0$ | $p_1$ | $p_2$ | $p_3$ | $p_4$ | $p_5$ | $p_6$ | $p_7$ | $l_0$ | $l_1$ | $l_2$ | |

| Bit Position | | | | | | | | | | |
|---|---|---|---|---|---|---|---|---|---|---|
| 22 | 23 | 24 | 25 | 26 | 27 | 28 | 29 | 30 | 31 | 32 |
| | | | | Parity | | | | | | Ck |
| p | p | p | p | p | p | p | p | p | p | p |
| p | p | p | p | p | p | p | p | p | p | p |

V - Vector Type $V_3 V_2 V_1 V_0$ = 1 0 1 1 - Grant of Reverse Channel Reservation
S - Signature (0–127 Decimal).
a - Number of Packets in a Data Unit
w - Size of Sliding window (in Units - SAU/DU) for ARQ Scheme (min = 2, max = 8), w = 001 indicates window size is 2, w = 111 indicates window size is 8.
f - Start Frame number from current frame (0–63).
p - Start Packet ($p_7 p_6 \ldots p_1 p_0$) = Packet Count from start of reverse channel
l - Reservation Length in Units (SAU/DU)
x - Std 4 bit Check Character Once the "Grant of Reverse Channel Reservation" vector has been received, the transceiver formats the message into DUs preceded by a Start Address Unit (SAU). The SAU and each DU contain a 4 bit identification code and a 12 bit cyclic redundancy check (CRC). See Table 6 for a description of the bits within the Start Address Unit vector.

TABLE 6

Start Address Unit

| Ramp Up Bits (1 → 26) | | | | | | | | | | | | | |
|---|---|---|---|---|---|---|---|---|---|---|---|---|---|
| 1 | 2 | 3 | 4 | 5 | 6 | 7 | 8 | 9 | 10 | 11 | 12 | 13 | 14 |
| 1 | 0 | 0 | 0 | 1 | 0 | 0 | 0 | 1 | 0 | 0 | 0 | 1 | 0 |
| 15 | 16 | 17 | 18 | 19 | 20 | 21 | 22 | 23 | 24 | 25 | 26 | | |
| 0 | 0 | 1 | 0 | 0 | 0 | 1 | 0 | 0 | 0 | 1 | 0 | | |

| Sync Pattern (27 → 50) | | | | | | | | | | | | | |
|---|---|---|---|---|---|---|---|---|---|---|---|---|---|
| 27 | 28 | 29 | 30 | 31 | 32 | 33 | 34 | 35 | 36 | 37 | 38 | 39 | 40 |
| 0 | 0 | 0 | 0 | 0 | 0 | 0 | 0 | 0 | 0 | 1 | 0 | 1 | 0 |
| 41 | 42 | 43 | 44 | 45 | 46 | 47 | 48 | 49 | 50 | | | | |
| 0 | 0 | 1 | 0 | 0 | 0 | 1 | 0 | 1 | 0 | | | | |

| Information Bits (51 → 76) | | | | | | | | | | | | | |
|---|---|---|---|---|---|---|---|---|---|---|---|---|---|
| 51 | 52 | 53 | 54 | 55 | 56 | 57 | 58 | 59 | 60 | 61 | 62 | 63 | 64 |
| 1 | 0 | $A_2$ | $A_1$ | $A_0$ | $I_2$ | $I_1$ | $I_0$ | $d_3$ | $d_2$ | $d_1$ | $d_0$ | r | r |
| 65 | 66 | 67 | 68 | 69 | 70 | 71 | 72 | 73 | 74 | 75 | 76 | | |
| r | $a_{29}$ | $a_{28}$ | $a_{27}$ | $a_{26}$ | $a_{25}$ | $a_{24}$ | $a_{23}$ | $a_{22}$ | $a_{21}$ | $a_{20}$ | $a_{19}$ | | |

| Information Bits (77 → 102) | | | | | | | | | | | | | |
|---|---|---|---|---|---|---|---|---|---|---|---|---|---|
| 77 | 78 | 79 | 80 | 81 | 82 | 83 | 84 | 85 | 86 | 87 | 88 | 89 | 90 |
| $a_{18}$ | $a_{17}$ | $a_{16}$ | $a_{15}$ | $a_{14}$ | $a_{13}$ | $a_{12}$ | $a_{11}$ | $a_{10}$ | $a_9$ | $a_8$ | $a_7$ | $a_6$ | $a_5$ |
| 91 | 92 | 92 | 94 | 95 | 96 | 97 | 98 | 99 | 100 | 101 | 102 | | |
| $a_4$ | $a_3$ | $a_2$ | $a_1$ | $a_0$ | $S_6$ | $S_5$ | $S_4$ | $S_3$ | $S_2$ | $S_1$ | $S_0$ | | |

TABLE 6-continued

Start Address Unit

CRC-12 Bits (103 → 114)

| 103 | 104 | 105 | 106 | 107 | 108 | 109 | 110 | 111 | 112 | 113 | 114 |
|---|---|---|---|---|---|---|---|---|---|---|---|
| $c_{11}$ | $c_{10}$ | $c_9$ | $c_8$ | $c_7$ | $c_6$ | $c_5$ | $c_4$ | $c_3$ | $c_2$ | $c_1$ | $c_0$ |

Reed-Solomon Parity Bits (115 → 128)

| 115 | 116 | 117 | 118 | 119 | 120 | 121 | 122 | 123 | 124 | 125 | 126 | 127 | 128 |
|---|---|---|---|---|---|---|---|---|---|---|---|---|---|
| p | p | p | p | p | p | p | p | p | p | p | p | p | p |

Reed-Solomon Parity Bits (129 → 154)

| 129 | 130 | 131 | 132 | 133 | 134 | 135 | 136 | 137 | 138 | 139 | 140 | 141 | 142 |
|---|---|---|---|---|---|---|---|---|---|---|---|---|---|
| p | p | p | p | p | p | p | p | p | p | p | p | p | p |
| 143 | 144 | 145 | 146 | 147 | 148 | 149 | 150 | 151 | 152 | 153 | 154 | | |
| p | p | p | p | p | p | p | p | p | p | p | p | | |

A - Number of Packets per Data Unit (1–8)
 $A_2 A_1 A_0$
 0 0 0 - 1 Packet per Data Unit
 0 0 1 - 2 Packets per Data Unit
 .
 .
 .
 1 1 1 - 8 Packets per Data Unit
1 - Number of Data Units in the transmission
 $l_2 l_1 l_0$
 0 0 0 - 1 Data Unit
 0 0 1 - 2 Data Units The Start Address Unit is the first packet of a scheduled message transmission. It contains the transmitting transceiver's address message length and other information to be used by the system when processing the messages. The Start Address Unit is always one packet long and contains a 12 bit CRC for detecting errors within the packet. The Start Address Unit that precedes the first data unit in a transmission indicates 1.) the number of packets in a data unit and 2.) the number of data units in the transmission.

The selective call transceiver then transmits the data starting in the time slot designated by the controller in the "Grant of Reverse Channel Reservation" vector. The System Controller maintains a data structure that contains the status of each received data unit and uses this information to set the ACK flags in the "Command to PMU" or "Command to PMU with Scheduling" vectors. Each data unit contains a CRC which is used to check the integrity of the received data. As each data unit is received by the controller, the CRC is evaluated and it is placed into the message memory of the controller.

After receiving the transmission, the system controller sends a "Command to PMU" or a "Command to PMU with Scheduling" vector to the selective call transceiver with the acknowledgment information pertaining to the reverse channel message. See Table 7 for a description of the bits within the Command to PMU vector.

TABLE 7

Command to PMU

Bit Position

| 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|
| | | | | | | | | | | Information | | | | | | | | | | |
| $x_0$ | $x_1$ | $x_2$ | $x_3$ | $V_0$ | $V_1$ | $V_2$ | $V_3$ | $S_0$ | $S_1$ | $S_2$ | $S_3$ | $S_4$ | $S_5$ | $S_6$ | $t_0$ | $t_1$ | $t_2$ | $t_3$ | $t_4$ | r |
| $x_0$ | $x_1$ | $x_2$ | $x_3$ | $b_0$ | $b_1$ | $b_2$ | $b_3$ | $b_4$ | $b_5$ | $b_6$ | $b_7$ | $g_0$ | r | r | r | r | r | r | r | r |

Bit Position

| 22 | 23 | 24 | 25 | 26 | 27 | 28 | 29 | 30 | 31 | 32 |
|---|---|---|---|---|---|---|---|---|---|---|
| | | | | | Parity | | | | | Ck |
| p | p | p | p | p | p | p | p | p | p | p |
| p | p | p | p | p | p | p | p | p | p | p |

TABLE 7-continued

| Command to PMU |
|---|

V - Vector Type $V_3 V_2 V_1 V_0$ = 1 0 0 1 - Command to PMU
S - Signature (0–127 Decimal).
t - Message type (5 bits)
    0 0 0 0 0 - ACK/NACK information for reverse channel transmission.
    0 1 0 1 0 - Location Query (to be sent ALOHA).
    1 1 0 0 1 - Status Request.
    1 1 1 1 1 - Give Up.
b - Ack Flags (ACK = 1, NACK = 0) Flags correspond to 8 Units (SAU/DUs).
g - Unscheduled (ALOHA) Response required.
r - Reserved (9 bits).
x - Std 4 bit Check Character The Command to PMU vector is used to transmit control messages to the transceiver and to provide acknowledgment information for reverse channel transmissions. This vector has no associated message in the message fields. The system will use this vector to provide information such as an ACK or to request information.

The "Command to PMU with Scheduling" vector has fields that enable the system to send another reservation grant, if needed, in addition to the acknowledgment information so that the selective call transceiver is able to continue with the long transmission and/or re-transmit DUs NACK'd by the controller. See Table 8 for a description of the bits within the "Command to PMU with Scheduling" vector.

providing scheduling information for the responses. The Function Controller within the selective call transceiver maintains a data structure containing ACK flag status bits for 15 data units. Whenever a NACK is received for a given data unit, the transceiver re-transmits that data unit according to the scheduling information given in the "Command To PMU With Scheduling" vector.

The selective call transceiver examines the ACK flags field in predetermined bit positions in the received vector (Command to PMU or Command to PMU with Scheduling) and determines which DUs of the group of DUs transmitted must be re-transmitted based upon the bit value of the ACK flags. As Tables 7 and 8 show, there are eight ACK flags (b0 to b7) in the vectors. This is exactly half the maximum

TABLE 8

Command to PMU with Scheduling

| \multicolumn{21}{c|}{Bit Position} |||||||||||||||||||||
|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 |
| | | | | | | | | | | Information | | | | | | | | | | |
| $x_0$ | $x_1$ | $x_2$ | $x_3$ | $V_0$ | $V_1$ | $V_2$ | $V_3$ | $S_0$ | $S_1$ | $S_2$ | $S_3$ | $S_4$ | $S_5$ | $S_6$ | $t_0$ | $t_1$ | $t_2$ | $t_3$ | $t_4$ | r |
| $x_0$ | $x_1$ | $x_2$ | $x_3$ | $b_0$ | $b_1$ | $b_2$ | $b_3$ | $b_4$ | $b_5$ | $b_6$ | $b_7$ | $g_0$ | $f_0$ | $f_1$ | $f_2$ | $f_3$ | $f_4$ | $f_5$ | $f_6$ | r |
| $x_0$ | $x_1$ | $x_2$ | $x_3$ | $p_0$ | $p_1$ | $p_2$ | $p_3$ | $p_4$ | $p_5$ | $p_6$ | $p_7$ | $l_0$ | $l_1$ | $l_2$ | r | r | r | r | r | r |

| \multicolumn{11}{c|}{Bit Position} |||||||||||
|---|---|---|---|---|---|---|---|---|---|---|
| 22 | 23 | 24 | 25 | 26 | 27 | 28 | 29 | 30 | 31 | 32 |
| | | | | Parity | | | | | | Ck |
| p | p | p | p | p | p | p | p | p | p | p |
| p | p | p | p | p | p | p | p | p | p | p |
| p | p | p | p | p | p | p | p | p | p | p |

V - Vector Type $V_3 V_2 V_1 V_0$ = 1 1 0 0 - Command to PMU With Scheduling information.
S - Signature (0–127 Decimal).
t - Message type (5 bits)
    0 0 0 0 0 - ACK/NACK information for reverse channel transmission.
    0 0 1 1 0 - Host Busy.
    1 0 1 0 1 - Resend Last Transmission.
    1 1 1 1 1 - Give Up.
b - Ack Flags (ACK = 1, NACK = 0) Flags correspond to 8 Units (SAU/DUs).
g - Unscheduled (Aloha) Response required.
f - Start Frame number from current frame (0–127).
p - Start Packet ($p_7 p_6 \ldots p_1 p_0$) = Packet Count from start of reverse channel
l - Reservation Length in Data Units ($l_2 l_1 l_0$)
r - Reserved (8 bits).
x - Std 4 bit Check Character The command to PMU With Scheduling vector allows the system to specify response scheduling information while providing command or acknowledgment information to the transceiver. This vector is primarily used for ARQ acknowledgments with transceiver transmissions required or for requesting status information from the transceiver while number of identification codes that could be allocated to data units by a transceiver. The transceiver then performs another transmission of a subsequent group of DUs, if needed. The transceiver either re-transmits the incorrect data units, or continues with new data units of the same message, or does a combination of both. This process continues until the entire message has been successfully received by the controller or the transmission is aborted due to response timeout.

The selective call transceiver allocates an identification code, preferably an identification (ID) number, to Start Address units and Data units, cyclically from 0 to 15 always ensuring that the data unit associated with the ID number has been acknowledged before reusing the ID. Since the transceiver assigns data unit numbers to message fragments internally and keeps track of that information internally, the actual message fragment numbers are not transmitted over the air. The acknowledgment information sent over the air pertains to the data units most recently transmitted by the transceiver. The ARQ sliding window size puts limitations on the number of unacknowledged ID's that the transceiver is able to allocate. The controller also keeps a list of the ID's that it has received and acknowledged. This enables the controller to schedule more DUs efficiently.

If the system controller does not receive a scheduled reverse channel transmission, it cannot identify whether the forward channel transmission (reservation grant) or the reverse channel transmission (SAUs/DUs) were lost. In either case, the controller sends the "Command to PMU with Scheduling" vector using the message type "Re-send Last Transmission". The selective call transceiver responds by transmitting the last set of data units it was commanded to send. Upon receiving this re-transmission, the controller can then determine the data unit numbers and window sequence numbers (i.e., the state of the transceiver) and re-synchronize with those numbers.

The data unit numbers are assigned to the message by the selective call transceiver sequentially using the range of 0–15. The transceiver keeps track of which message fragments have been sent to the system controller. The controller responds to the transceiver using the assigned DU numbers. Thus, the controller is not aware of the actual number of message fragments i.e., DUs, only the DU numbers received in the transmission.

The ARQ method of the invention, optimized for use in such limited inbound messaging capable systems, minimizes the processing, memory and transmission requirements for selective call transceivers operating in a two-way paging system. The invention also provides the capability for reverse channel frequency reuse. The system controller designates the transmission frequency, start time and duration and determines which receiver(s) will receive a transmission from a transceiver by looking at the receiver identification number attached to the last previously received message from the transceiver.

The controller can then determine the approximate geographic location of the transceivers and assign the same transmission time slots to several transceivers provided that they are far enough apart so that they would not interfere with each other.

The following three examples illustrate the use of the ACK flags and DU numbers during a long reverse channel transmission from the selective call transceiver to the system controller and error recovery when transmissions are lost on the forward and reverse channels.

Figure 6:
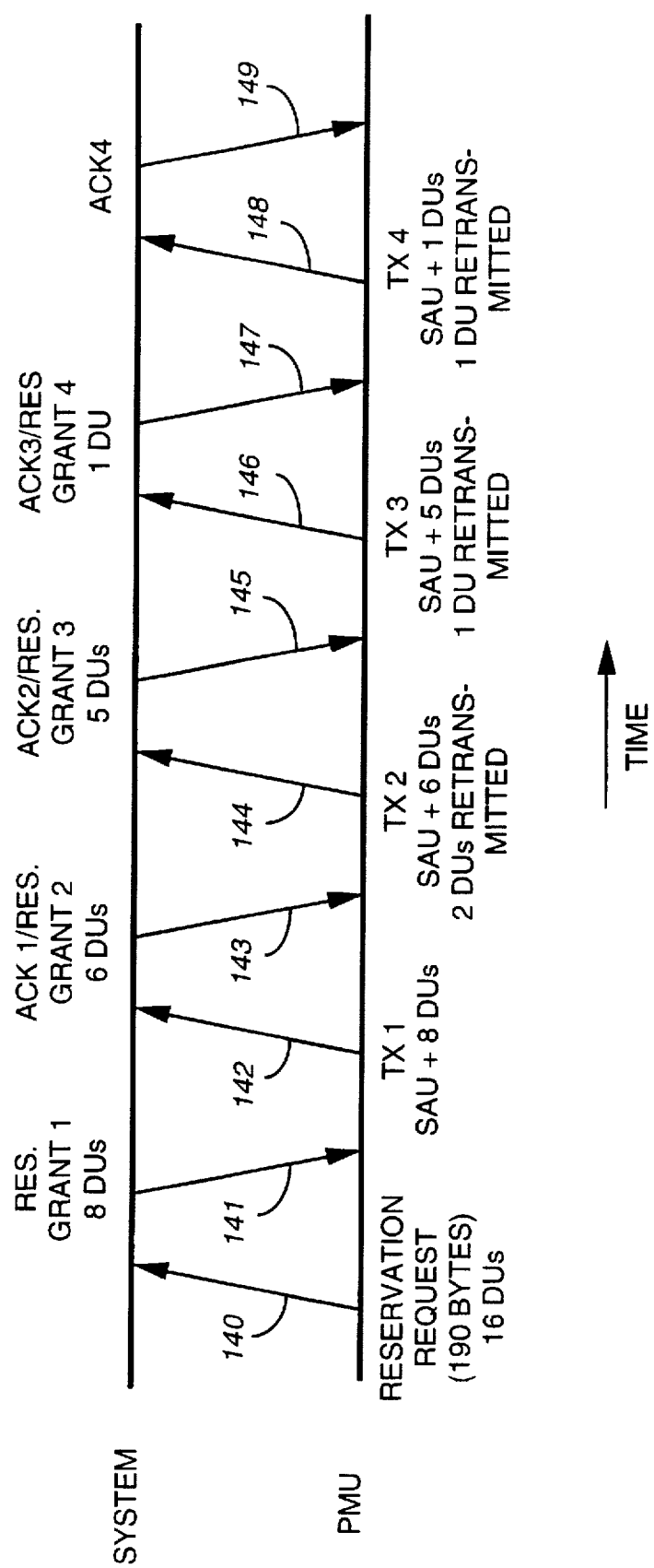
FIG. 6 is a diagram of a series of wireless communications between the system controller and a selective call transceiver.

Referring now to FIG. 6, the first example shows the various states of the ARQ window as well as the data unit numbers and how they map into the associated ACK bits that arrive on the forward channel. A sequence of transactions between the system controller and the transceiver, or PMU (personal messaging unit), is shown in FIGS. 7, 8, 9, 10, and 11 as the controller acknowledges reverse channel transmissions and schedules additional reverse channel transmission time. FIG. 6 is a diagrammatic representation of an exchange of radio frequency transmissions between the system controller 26 and a selective call transceiver 32. Initially, the transceiver transmits a Reservation Request vector as shown in Table 2. Bits D14 to D11 identify the vector as either a reservation request vector for message of length between 1 to 2048 bytes or as a long reservation request vector for messages of length greater than 2048 bytes. Bits D10 to D0 indicate the length of the message for which the reservation is being made. The reservation request is made ALOHA style. The controller determines the quality of the signal carrying the reservation request vector, and, in response to the quality of the reservation request signal, determines a data unit size of each of the at least one data unit. In this example the message length is 190 bytes which is calculated by realizing that 190 8-bit bytes are equal to 1520 bits, and the example assumes that (possibly due to poor channel quality) there will be only one packet per data unit. The first packet per data unit has a capacity of 98 bits. The message in this example requires 15.4 data units, but because an integral number of data units is required, a total number of data units required in this example is 16. After receiving the reservation request, the controller transmits a Grant of Reverse Channel Reservation vector as shown in Table 5. Each data unit includes at least one packet. Each packet contains at least a portion of one data unit.

Figure 7:
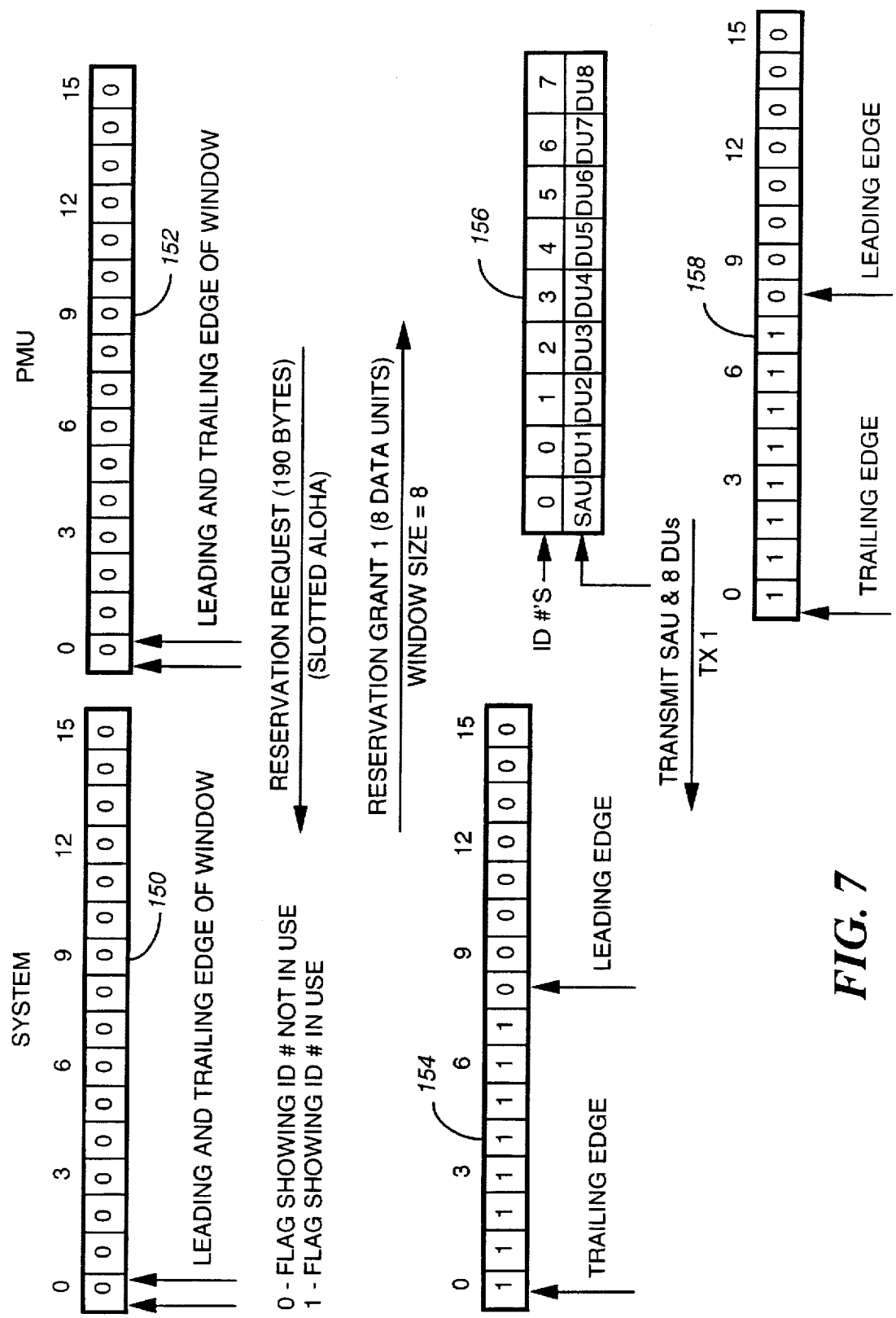
FIG. 7 is a representation of changes in sliding window data structures in the system controller and in the selective call transceiver during the series of wireless communications of FIG. 6.

Referring now to FIG. 7, the state of the sliding window, or window, is initially all zeros for all sixteen ACK flags, with both the leading and trailing edge of the window being at the first ACK flag (i.e., ACK flag 0) in both the system (i.e., controller's) memory and in the PMU's (i.e., transceiver's) memory. The controller's window and the transceiver's window shown in the drawings are representations of data blocks, and contents thereof, in the controller's and the transceiver's memory, respectively. The controller's window 150 and the transceiver's window 152 show zeros for all sixteen IDs which means that all sixteen IDs are not in use. These are the states of the windows prior to the transceiver transmitting a "Reservation Request" vector, such as shown in Table 2, during transmission 140 (see FIG. 6). Block 154 shows the state of the controller's window after the reservation grant #1, and after the controller has transmitted a "Grant of Reverse Channel Reservation" vector shown in Table 5 during transmission 141. Block 154 shows that the leading edge of the window has moved to ID #8. Block 156 represents the DUs transmitted by the transceiver after it reacts to receipt of "Reservation Grant 1", and also shows the ID number associated with each DU. One SAU and eight DUs (DU1 through DU8) are transmitted having IDs of 0 through 7, respectively. Block 158 represents the state of the transceiver's window after it made transmission 142 (TX 1) (See FIG. 6).

Figure 8:
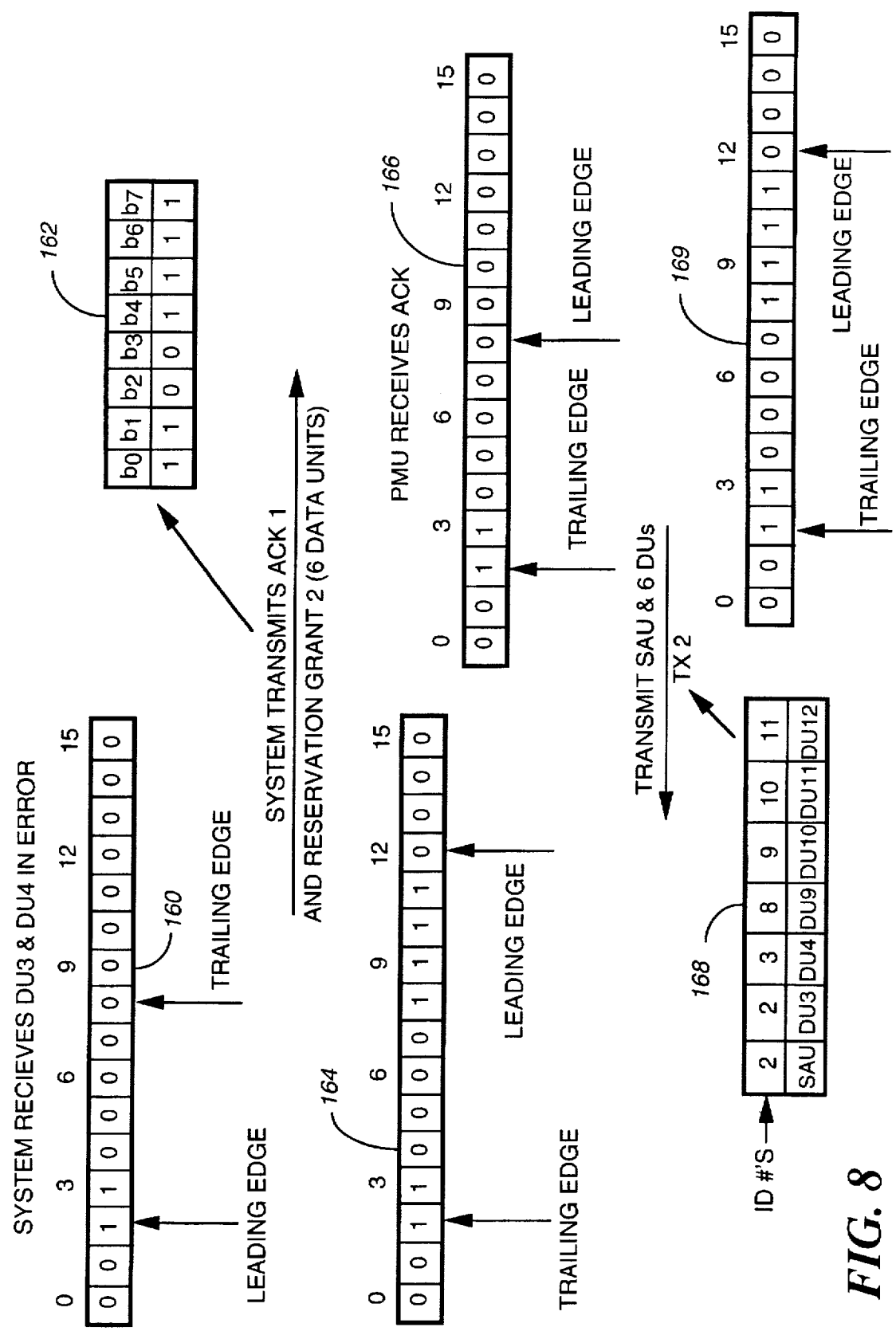
FIG. 8 is a representation of changes in sliding window data structures in the system controller and in the selective call transceiver during the series of wireless communications of FIG. 6.

Referring now to FIG. 8, the state of the controller's window 160 shows that DUs 3 and 4 were not received without error, and, as a result, two of the IDs (IDs 2 and 3) are still in use. Block 162 shows the ACK flag field in the "Command to PMU with Scheduling" vector of Table 8. This vector with this field is transmitted by the controller to the transceiver as transmission 143 in FIG. 6. Block 162 shows that the DUs associated with IDs 2 and 3 were not received error-free. Block 164 shows the state of the controller's window after transmission 143, and shows that IDs 2, 3, 8, 9, 10, and 11 are in use, and that both the trailing edge and the leading edge of the window have moved to the right, but the window has not increase in size beyond size eight. Block 166 shows the state of the transceiver's window after it has received the acknowledgment of successful receipt of DUs 1, 2, 5, 6, 7, and 8. The trailing edge of the transceiver's window has moved two IDs to the right as a result of the successful receipt of DUs 1 and 2. Block 168 represents a new association between DUs and IDs for a subsequent transmission of a subsequent group of data units. Data units 3 and 4 are re-transmitted and DUs 9 through 12 are transmitted for the first time. After transmission of this subsequent group of DUs in transmission 144 (TX 2) (see FIG. 6), the state of the transceiver's window is as shown in block 169 in which the leading edge of the window has moved four IDs to the right while still maintaining a window size of eight.

Figure 9:
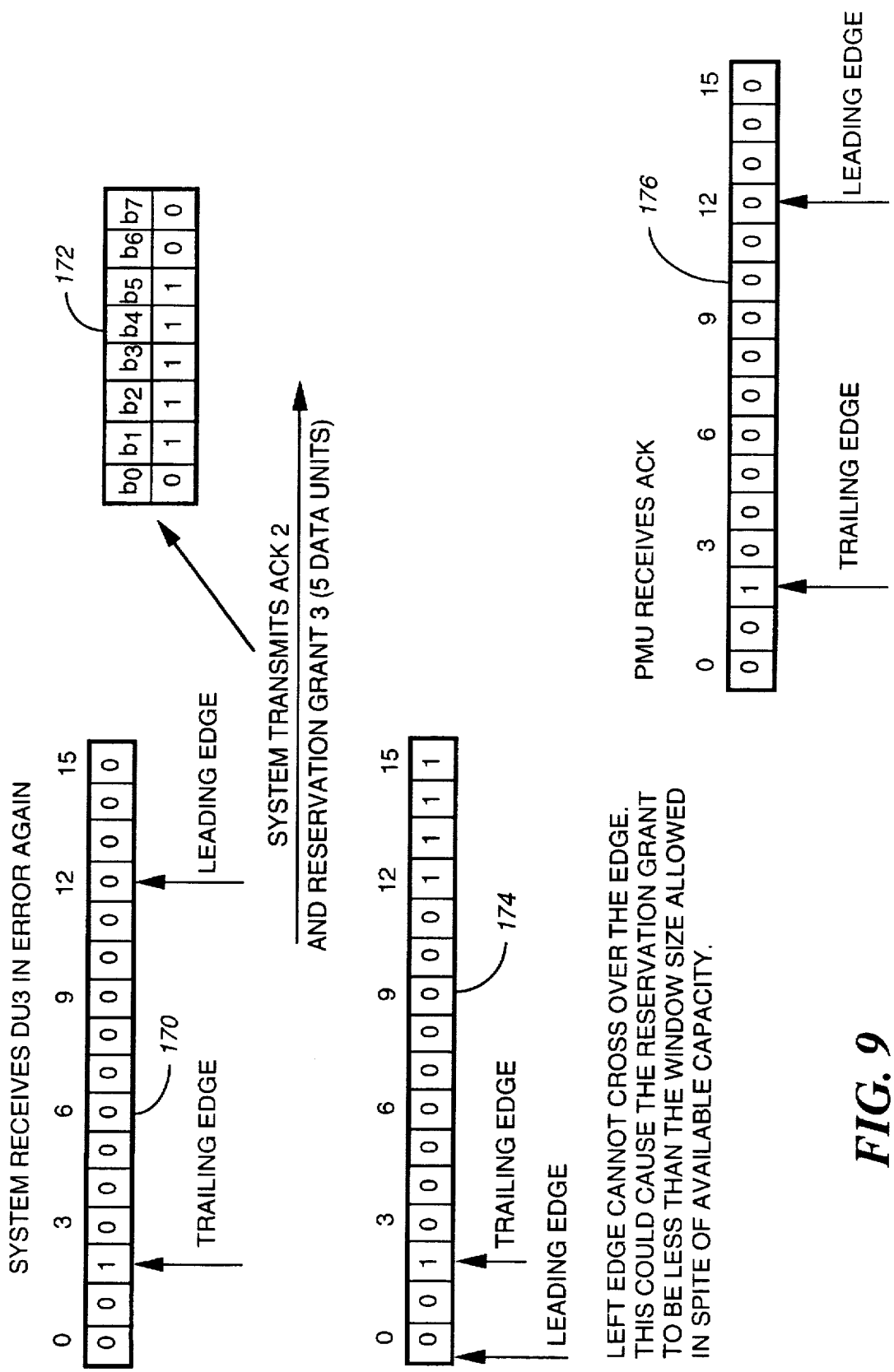
FIG. 9 is a representation of changes in sliding window data structures in the system controller and in the selective call transceiver during the series of wireless communications of FIG. 6.

Referring now to FIG. 9, block 170 shows the state of the controller's window after the controller receives the subsequent group of DUs. Block 170 shows that DU3 was, again, not received error-free; therefore, the flag for ID #2 is "1" which means that ID #2 is still in use. The controller then transmits a "Command to PMU with Scheduling" vector during transmission 145 (see FIG. 6). Block 172 shows the ACK flags in another "Command to PMU with Scheduling" vector. A "0" for bit $b_0$ indicates that DU3 was not acknowledged. A "1" for bits $b_1$ through $b_5$ indicates that DU4, DU9, DU10, DU11, and DU12 were received error-free and, therefore, acknowledged. Block 174 shows the state of the controller's window after transmission 145 (FIG. 6). Block 174 shows that the leading edge of the window has moved four IDs to the right, and that IDs #12 through #15 are now in use. Block 176 shows the state of the transceiver's window after the transceiver receives transmission 145 from the controller. Block 176 shows that the transceiver recognizes that all previously sent DUs, except for DU3, having ID #2, have been acknowledged by the controller.

Figure 10:
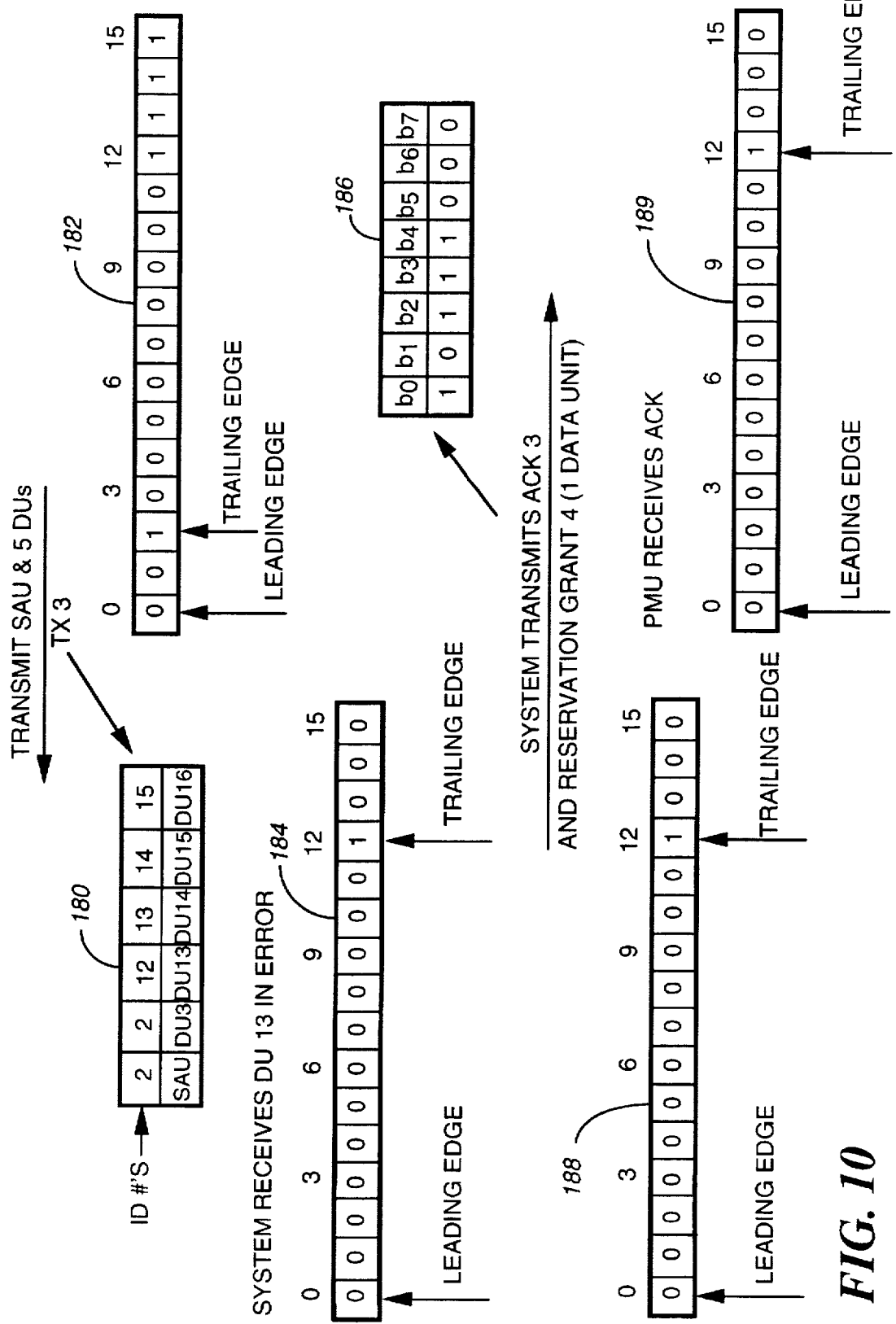
FIG. 10 is a representation of changes in sliding window data structures in the system controller and in the selective call transceiver during the series of wireless communications of FIG. 6.

Referring now to FIG. 10, block 180 shows a second subsequent group of data units and their associated IDs transmitted by the transceiver in transmission 146 (TX3) (see FIG. 6). Transmission 146 comprises an SAU and five DUs. Block 182 shows the state of the transceiver's window after transmission 146. Block 182 shows that five IDs are in use. Block 184 shows the state of the controller's window after the controller receives transmission 146. Block 184 shows that DU13, associated with ID #12, was not received error-free. Block 186 shows the ACK flags in the "Command to PMU with Scheduling" vector. A "0" for bit $b_1$ indicates that DU13 was not acknowledged. A "1" for bits $b_0$ and bits $b_2$ through $b_4$ indicates that DU3, DU14, DU15, and DU16 were received error-free and, therefore, acknowledged. The controller then transmits yet another "Command to PMU with Scheduling" vector during transmission 147 (see FIG. 6). Block 188 shows the state of the controller's window after transmission 147. Block 189 shows the state of the transceiver's window after the transceiver receives transmission 147.

Figure 11:
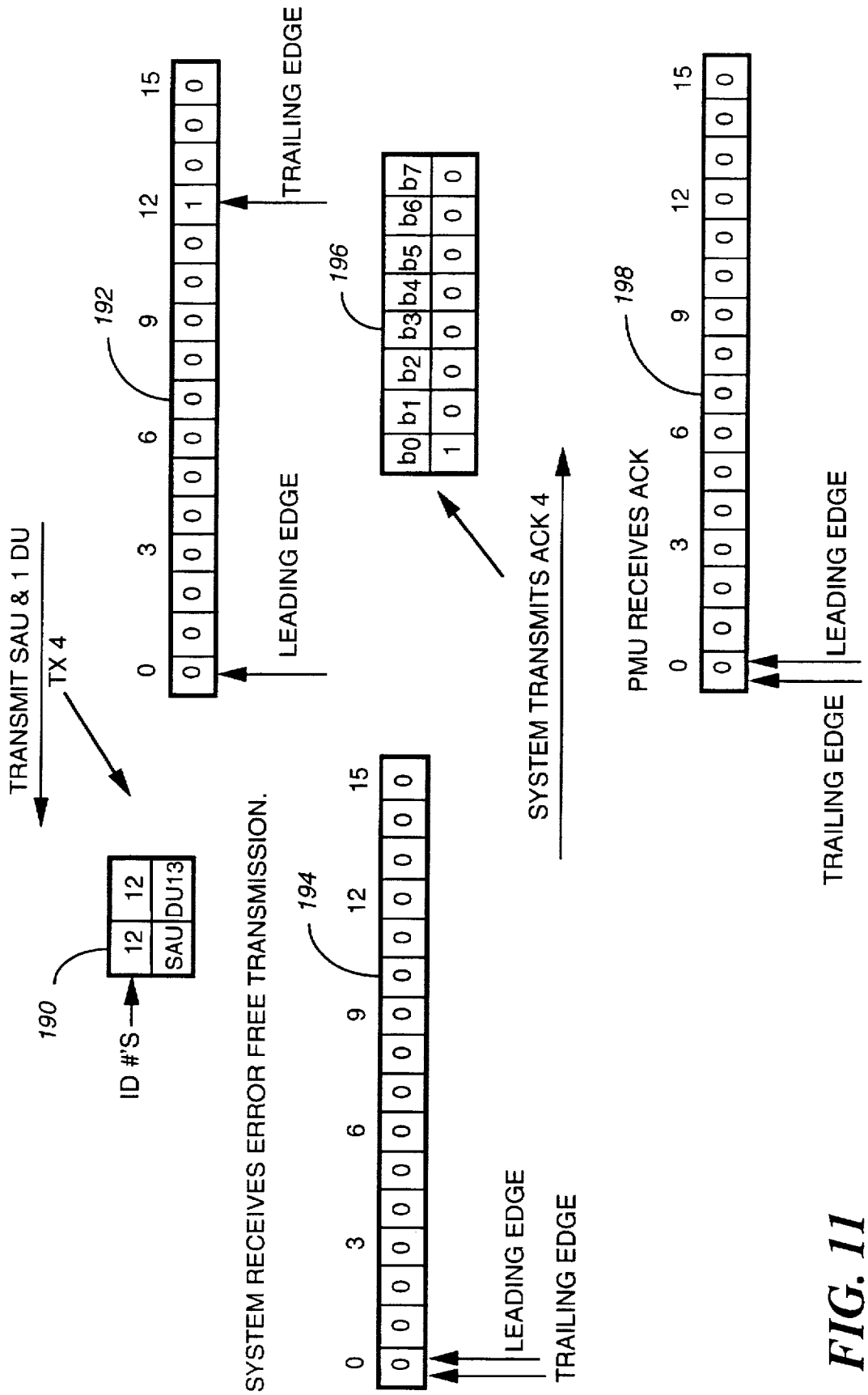
FIG. 11 is a representation of changes in sliding window data structures in the system controller and in the selective call transceiver during the series of wireless communications of FIG. 6.

Referring now to FIG. 11, block 190 shows the contents of transmission 148 (FIG. 6) made by the transceiver. Transmission 148 comprises an SAU and DU13, having an associated ID #12. Block 192 shows the state of the transceiver's window after transmission 148, and shows only ID #12 as in use. Block 194 shows that none of the IDs are in use. This is a consequence of the controller having received DU13 error-free. Block 196 shows the ACK flags $b_0$ through $b_7$ of the "Command to PMU" vector shown in Table 7 that is transmitted during transmission 149 (TX 4) shown in FIG. 6. Block 196 shows that bit $b_0$ has a value of "1" which means that the data unit comprising transmission 149 was acknowledged. Block 198 shows the state of the transceiver's window after it received transmission 149. Block 198 shows that no IDs are in use.

Figure 12:
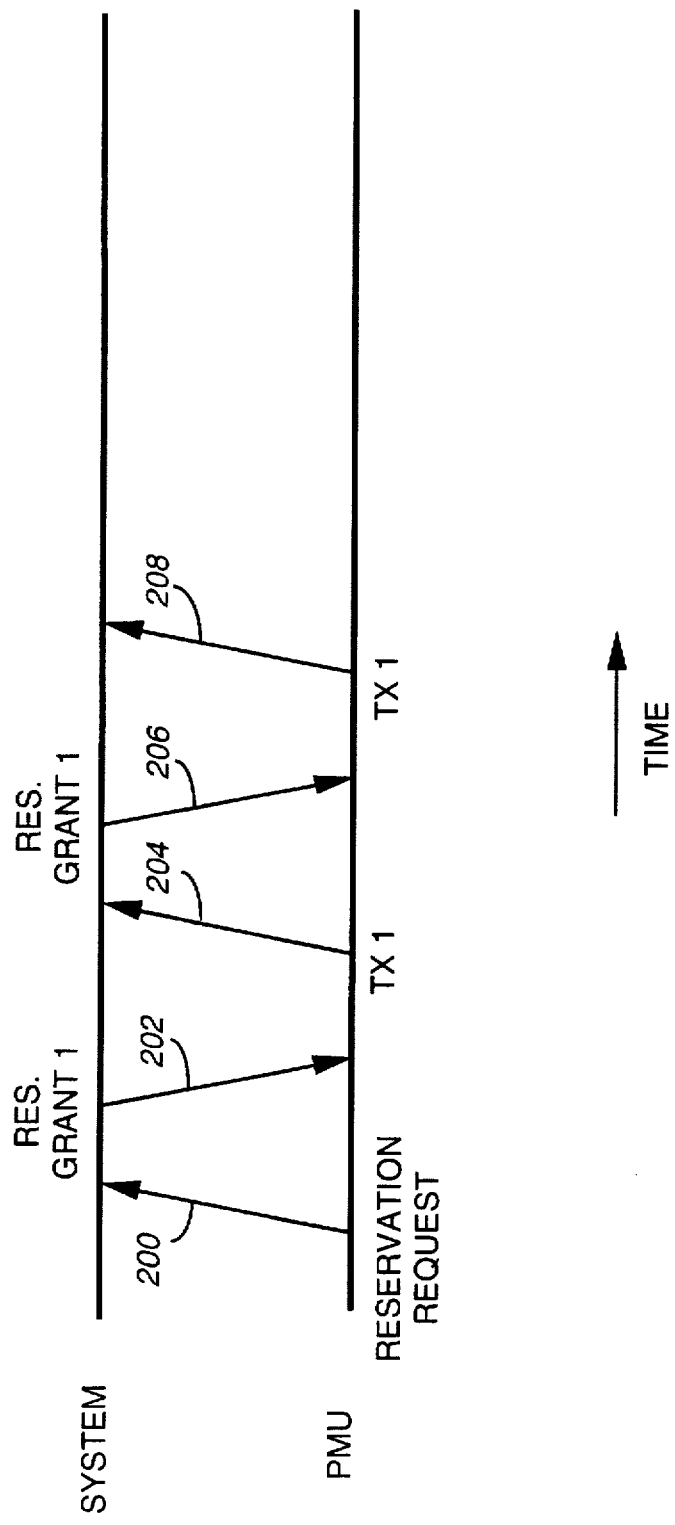
FIG. 12 is a diagram of another series of wireless communications between the system controller and a selective call transceiver.

Referring now to FIG. 12, the second example shows the following sequence of events. System (i.e., the controller) receives a reservation request 200 and transmits a reservation grant 202. The controller does not receive transmission 204 from transceiver and the controller re-transmits the reservation grant in transmission 206. The reason for not receiving transmission 204 could be the loss of reservation grant 202 on the forward channel or the loss of transmission 204 on the reverse channel. If reservation grant 202 was lost, the transceiver receives a reservation grant in transmission 206 and transmits its first transmission 208. On the other hand, if transmission 204 was lost, the transceiver receives reservation grant 202 twice and re-transmits its last transmission 204. The first reservation grant has initial information for setting up the message transmission. If the system does not receive a transmission corresponding to the first reservation grant then the first reservation grant is re-transmitted instead of the "Resend Last Transmission" request.

Figure 13:
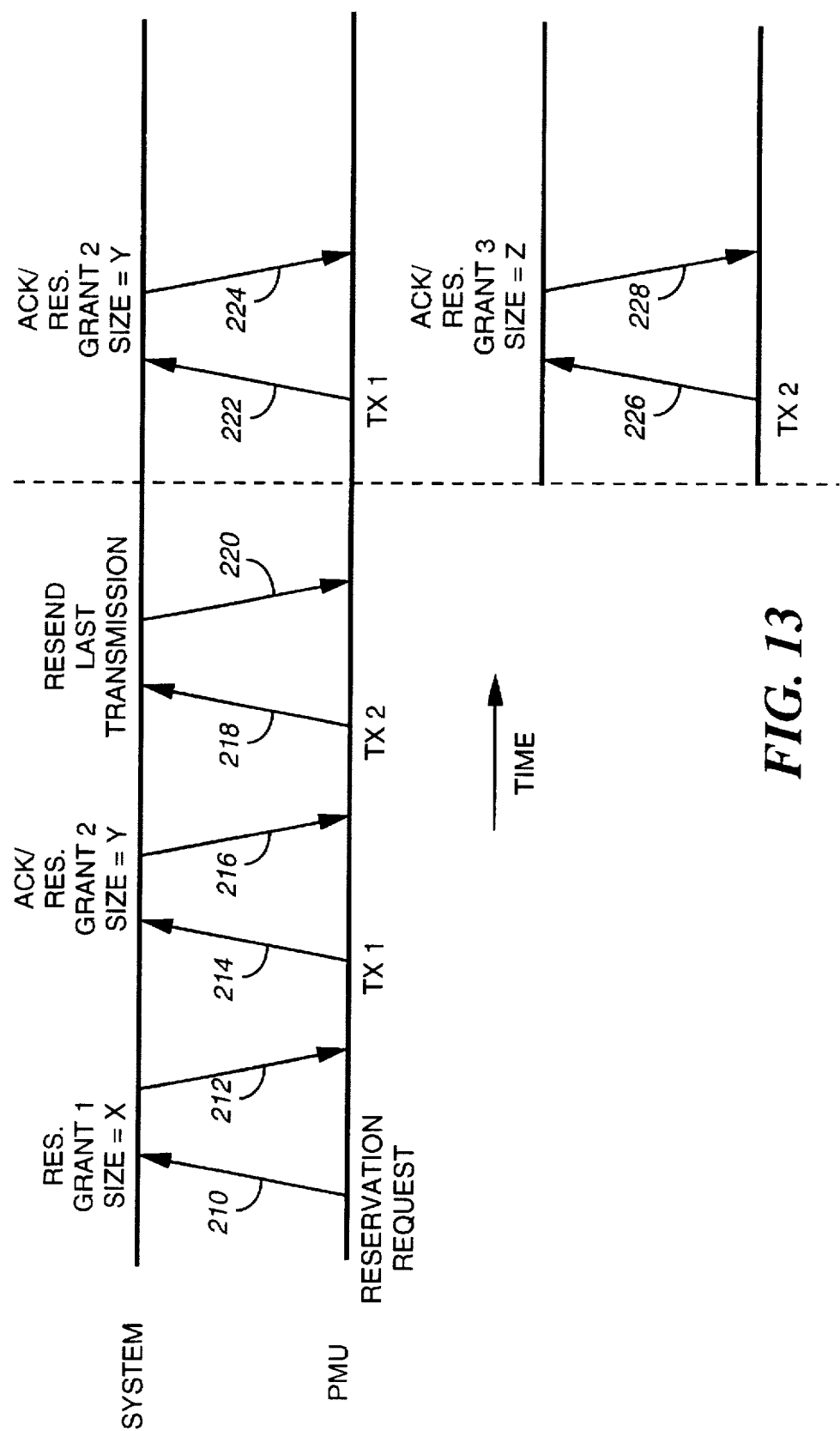
FIG. 13 is a diagram of yet another series of wireless communications between the system controller and a selective call transceiver.

Referring now to FIG. 13, the third example shows the following exchange of transmissions between a transceiver and the system. The system (i.e., the controller) receives a reservation request 210 and transmits a reservation grant 212 of size X. The controller receives transmission 214 from the transceiver and the controller transmits during transmission 216 a "Command to PMU with Scheduling" vector containing acknowledgment information and the next reservation grant of size Y. The controller does not receive transmission 218 from the transceiver and the controller transmits during transmission 220 another "Command to PMU with Scheduling" vector, with "Resend Last Transmission" request. The reservation grant in transmission 220 is the larger of the two previous grants of sizes X and Y. The reason for not receiving transmission 218 could have been the loss of transmission 216 on the forward channel or the loss of transmission 218 on the reverse channel. If the "Command to PMU" vector transmitted during transmission 216 were lost, the transceiver receives the "Command to PMU" vector during the transmission 220 with "Resend Last Transmission" request and the transceiver would transmit its previous transmission during transmission 222. This allows the controller to determine the state of the transceiver and re-transmit "Command to PMU with Scheduling" vector containing acknowledgment information and the next reservation grant of size Y during transmission 224. If, however, transmission 218 instead were lost, the transceiver receives the "Command to PMU" vector during transmission 220 with "Resend Last Transmission" request and the transceiver would transmit its previous transmission during transmission 226. This allows the system to determine the state of the transceiver and transmit "Command to PMU with Scheduling" vector containing acknowledgment information and the next reservation grant of size Z during transmission 228.

Figure 14:
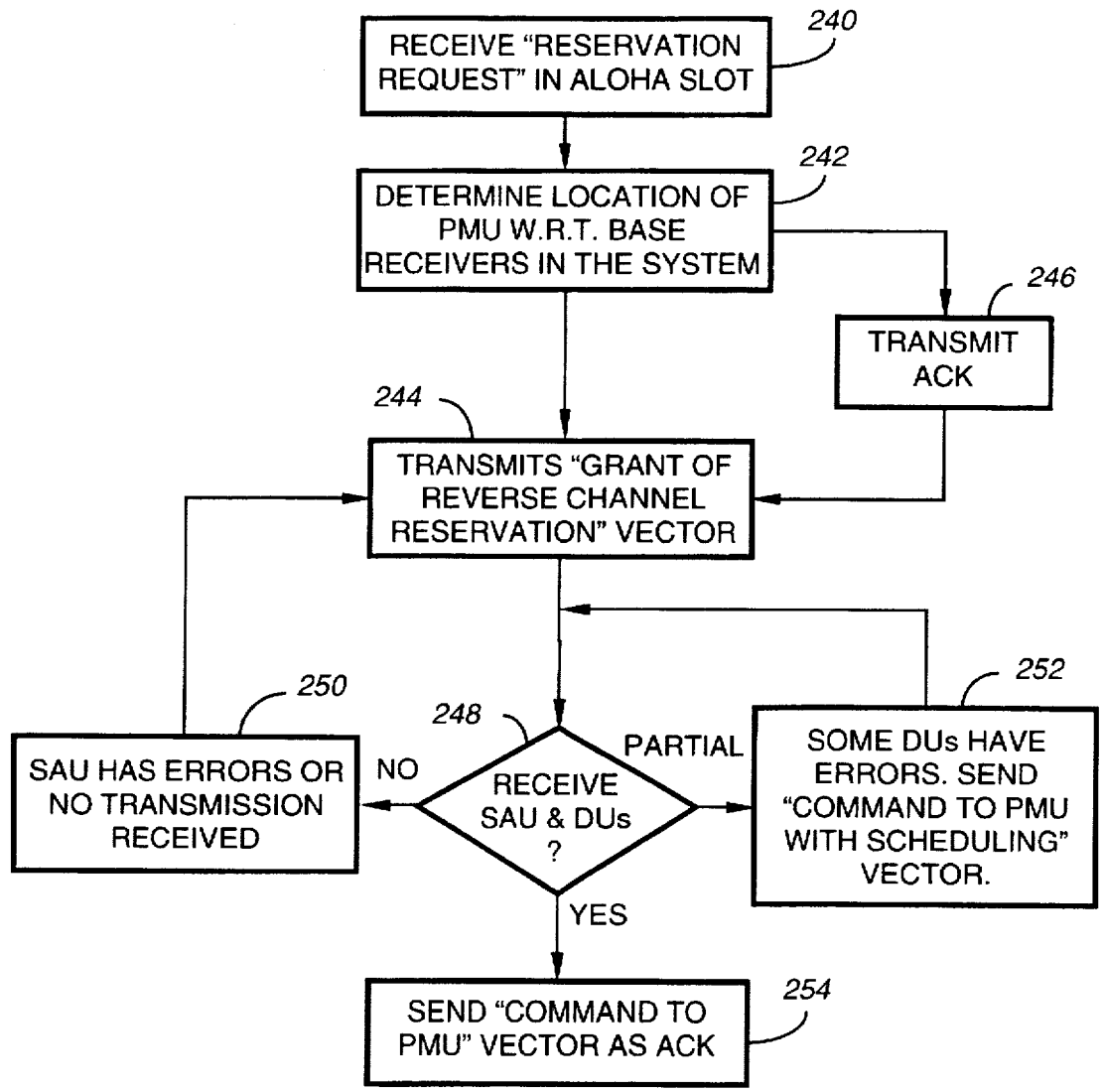
FIG. 14 is a flow diagram of the operation of the reverse channel ARQ scheme for the system controller.

FIG. 14 is a flow chart of the processing required at the system controller to implement reverse channel scheduled messaging with ARQ. At step 240, the controller receives a "Reservation Request" or a "Long Reservation Request" in the slotted ALOHA portion of the reverse channel, which is transmitted by a selective call transceiver 32 and decoded by one or more receivers 30 in the system 20. At step 242, the controller 26 determines the location of the transceiver 32 with respect to the receivers 30 in the system 20. This information is used to implement frequency reuse in the system 20, where two or more transceivers are assigned the same or overlapping time slots in the reverse channel of the same frequency, for reverse channel transmissions. At step 244, the controller transmits a signal containing a "Grant of Reverse Channel Reservation" vector, for positive acknowledgment, to the transceiver. If the controller is busy, it alternatively transmits a positive acknowledgment only (a "Command to PMU" vector), followed by a "Grant of Reverse Channel Reservation" vector, as shown in step 246. Since the controller scheduled the transceiver to transmit on the reverse channel during a pre-defined time period, the controller waits for the reverse channel transmission, at step 248. At step 250, if no transmission is received by the receivers or if the SAU is decoded with errors, the controller transmits another "Grant of Reverse Channel Reservation" vector. At step 252, if the transmission is received by the receivers and some DUs are decoded with errors or the message has not been completely received by the controller, the controller transmits a "Command to PMU with Scheduling" vector. This vector is decoded by the transceiver and contains the acknowledgment information for the previous transmission of DUs and also contains reservation information for the next transmission. At step 254, if the reverse channel transmission is received error free by the receivers and the complete message has been received by the controller, the controller transmits a "Command to PMU" vector as a positive acknowledgment for the complete message.

Figure 15:
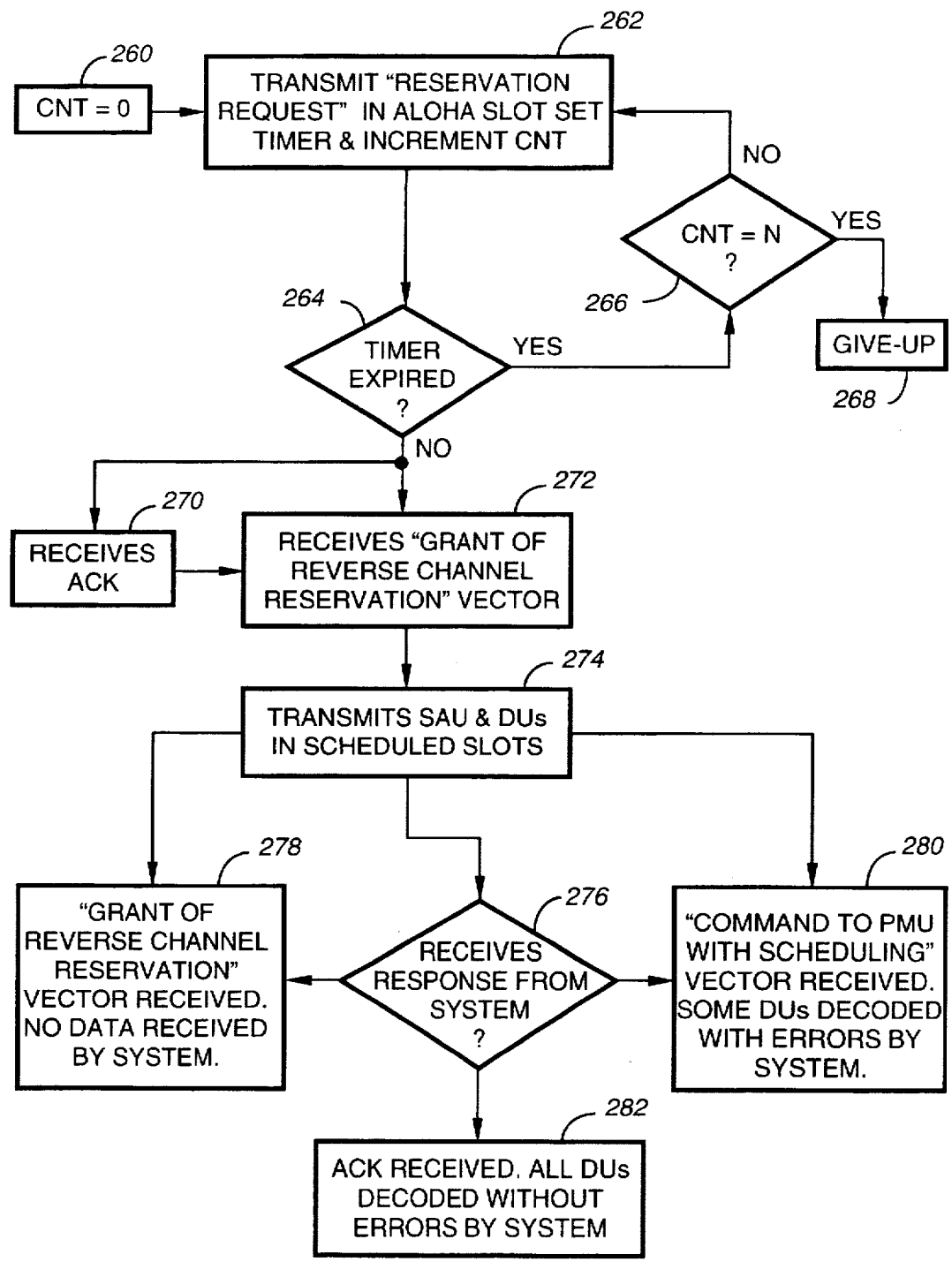
FIG. 15 is a flow diagram of the operation of the reverse channel ARQ scheme for the selective call transceiver

FIG. 15 is a flow chart of the processing required at the transceiver 32 to implement reverse channel scheduled messaging with ARQ. At step 260, prior to initiating a reverse channel scheduled message, the variable "Cnt" is set to zero. At step 262, a "Reservation Request" or a "Long Reservation Request" packet is transmitted by the transceiver in the slotted ALOHA portion of the reverse channel. A timer (not shown) is set and the variable "Cnt" is incremented. The packet contains the length of the message to be transmitted on the reverse channel. At step 264, if the timer expires before the transceiver receives a response to the reservation request, the variable "Cnt" is incremented and compared to a pre-determined limit "n", at step 266. If the variable "Cnt" is equal to the limit "n", the transceiver does not attempt to transmit the message and displays appropriate message to the user via the user interface, at step 268. If the variable "Cnt" is less than the limit "n", at step 266, the transceiver attempts to transmit the reservation request again at step 262. At step 270, if the transceiver receives a positive acknowledgment in a "Command to PMU" vector or in a "Grant of Reverse Channel Reservation" vector containing at least "number of data units" information and a "packet size" for the at least one packet (step 272), the timer is disabled. At step 274, message data is formatted in SAU and DUs by the transceiver for transmission in the time slots as scheduled by the controller 26. The transceiver then waits for the response from the controller, at step 276. At step 278, if the response from the controller is a reservation signal such as a "Grant of Reverse Channel Reservation" vector, the transceiver re-transmits the SAU and DUs, realizing that the first transmission was lost on the reverse channel. At step 280, if the response from the controller is a "Command to PMU with Scheduling" vector, the transceiver decodes the acknowledgment flags in the response vector and determines if there are any negative acknowledgments, in which case the transceiver re-transmits the DUs for which the negative acknowledgments were received. The time slots in the reverse channel to be used for transmission are specified in the response vector. In addition, if there is more message data to be transmitted by the transceiver and the controller has allocated more time slots than are required for transmitting the negatively acknowledged DUs, then additional message data is formatted in DUs and transmitted to the transceivers. At step 282, if the response from the controller is a "Command to PMU" vector, the transceiver decodes the acknowledgment flags in the response vector and realizes that no more reverse channel time has been allocated. If all the acknowledgment flags are positive and no more message data remains to be transmitted then the message transmission is complete. However, if there are any negative acknowledgments or message data remains to be transmitted, the transceiver 32 waits for further instructions from the system controller 26 regarding the message.

The invention provides tools necessary for the system controller 26 to implement scheduled reverse channel frequency reuse within a same forward channel simulcast zone. Also, the invention allows messages and message fragments transmitted by transceivers and received by fixed system infrastructure receivers, or receivers 30, to be to be independent and self-contained. A distributed non-intelligent network of receivers can then be used to receive and process different messages transmitted on the same channel simultaneously from geographically separated transceivers. Further, the invention provides Automatic Repeat Request (ARQ) for reverse channel messaging that is completely controlled by the controller 26. When a reverse channel response capability is added to a paging system it becomes desirable to implement an ARQ protocol so that messages or message fragments received in error can be re-transmitted. This invention provides an ARQ protocol that is suitable for an asymmetrical system in which all control for transmissions by (i.e., from) the selective call transceivers of the system 20 resides in the controller 26. The ARQ methodologies represented in the invention minimizes the memory and processing requirements of the selective call transceivers.

Another advantage of the invention is reverse channel frequency reuse. When a transceiver is to transmit a message the first transmission from the transceiver, for example an ALOHA Inbound Message Request, is used by the system to identify the location of the transceiver. Any receiver 30 that correctly decodes any transmission also relays its ID to the controller 26 along with the decoded transmission received from the transceivers. Because the system knows in advance the location of each receiver 30, the controller is able to identify the approximate location of a transceiver that generated the transmission as being within a predetermined radius around the receiver. If it has been determined that transmissions from two different transceivers 32 will be received at receivers with sufficient geographical separations the controller will be able to schedule simultaneous transmissions on the same reverse channel from these transceivers. The system scheduler is able to do this because it knows the relative location of each receiver 30 and the associated propagation environment. The system scheduler can calculate or estimate the expected signal to interference ratio at each receiver to determine if this ratio will be high enough at each receiver to allow for reliable signal decoding of the desired transceiver transmission when multiple simultaneous transceiver transmissions are scheduled on the channel, each transmission intended for (a) different receiver (s).

Figure 16:
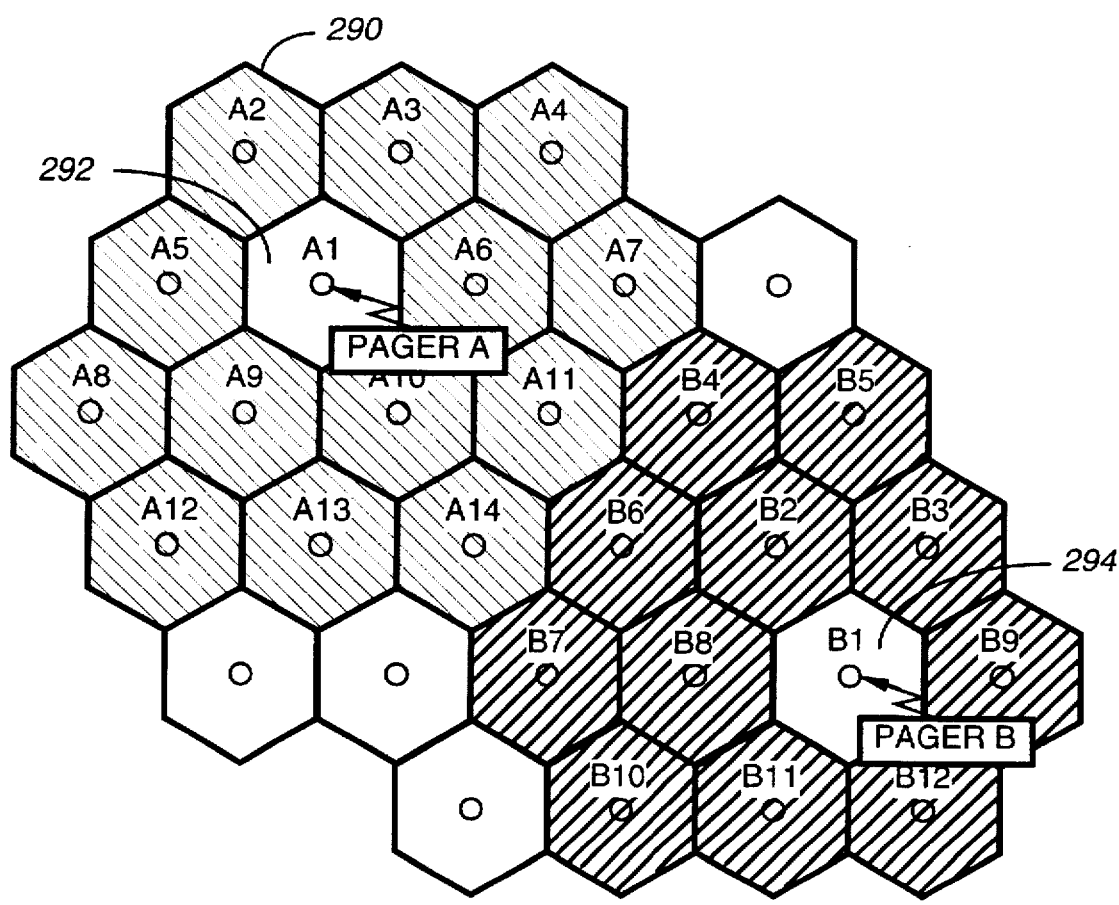
FIG. 16 is a diagram depicting a portion of the geographical area of the two-way wireless communication system 10.

FIG. 16 shows a portion of the geographical area of the two-way wireless communication system 10 comprising a plurality of cells 290 which define approximate geographical transmission areas within a simulcast communication, such as is well known to one skilled in the art. The wireless two-way communication system is organized to provide simultaneous frequency re-use, that is, "Pager A" in cell 292 can be scheduled to transmit at the same time on the same channel as "Pager B" in cell 294. This is due to the fact that these transceivers have sufficient geographical separation that their respective transmissions will be received by different receivers and the associated signal to interference ratio will be high enough to ensure reliable receptions. The controller has a memory for storing a geographical location of each of the plurality of receivers 30. The controller contains a database indicating that if a transceiver's 32 transmission is to be scheduled for reception at the receiver 30 labeled A1 in cell 292, then the receivers labeled A2 through A14 should not be scheduled for transmissions from other transceivers at the same time. Similarly, if a transceiver's transmission is to be scheduled for reception at the receiver labeled B1 in cell 294, then the receivers labeled B2 through B12 should not be scheduled for transmissions from other transceivers at the same time. From FIG. 16 it can be seen that the controller's database would permit the scheduling of simultaneous transmissions from two transceivers for reception by receivers A1 and B1.

The ARQ scheme of the invention allows complete control of transceiver transmissions by the system controller. The invention allows reverse channel frequency reuse to be governed by the controller. The preferred embodiment of the invention makes efficient use of the forward channel (the embodiment uses fewer data words in the forward channel commands) because a single bit for each DU is used to indicate the ACK or NACK status of the data unit. The invention is a "stop and wait" protocol, however this is not a disadvantage for short messages (8 DUs or fewer). Short messages do predominate on paging systems.

The transceiver formats the message in DUs preceded by a Start Address Unit SAU. The SAU and each DU have a 4 bit ID and a 12 bit CRC. The system sends a "Command to PMU" vector with the acknowledgment information pertaining to the reverse channel message. The "Command to PMU with Scheduling" vector has fields that enable the system to send another reservation grant if needed in addition to the acknowledgment information. The transceiver transmits the NACK'd data units or new data units of the message. The transceiver allocates ID numbers to Start Address units and Data units cyclically from 0 to 15, always ensuring that the unit associated with the ID number has been acknowledged before reusing the IDs. The ARQ window size puts limitations on the number of unacknowledged IDs that the transceiver can allocate. The system also keeps a list of the IDs that it received and acknowledged. This enables the system to schedule more DUs efficiently. If the system does not receive a scheduled reverse channel transmission it cannot identify whether the forward channel transmission reservation grant or the reverse channel transmission SAU/DU was lost. In either case the system sends the "Command to PMU With Scheduling" vector using the message type "Re-send Last Transmission". The transceiver responds by transmitting the last set of data units it believes it was commanded to send. The system can then determine the data unit and window sequence numbers (i.e., the state of the transceiver) and get back into synchronization with those numbers.

The following example illustrates the windowing and ID number allocation for a scheduled reverse channel message consisting of fifteen DUs. The window is a data structure in a memory in the transceiver. Initially the window has all ID numbers available (shown as 0) for assignment by the transceiver to data units transmitted by the transceiver.

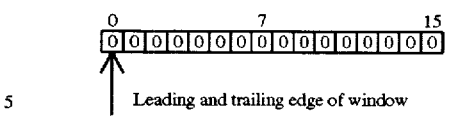

After sending a reservation request the transceiver receives a reservation grant to transmit a group of seven DUs. The transceiver transmits an SAU and seven DUs. It marks the IDs as "in use" (shown as 1) and moves the leading edge of the window to the next ID available.

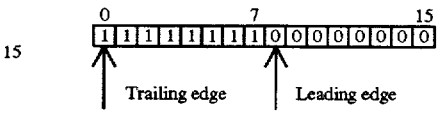

The system receives the scheduled message and transmits the Command to transceiver vector with the acknowledgment inform and more reservation grants if needed. The following shows IDs 4 and 6 as NACK'd and a reservation grant for five DUs.

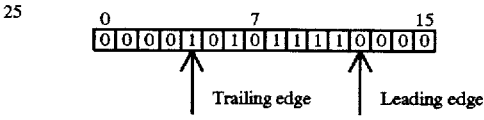

The transceiver updates the window using the acknowledgment information and a subsequent group of DUs transmitted. One ID is assigned to the SAU and five DUs are transmitted, two DUs of which are re-transmissions and three DUs are transmitted for the first time. The system receives the data, sends a NACK for ID 10 and gives a reservation grant of six DUs.

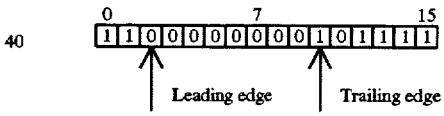

The transceiver updates the window, six DUs are transmitted, one of which is a re-transmission. The system receives the data without error and sends an ACK for the transmission. No additional scheduling information is sent as the entire message having a length of fifteen DUs has been received.

When a reverse channel response capability is added to a paging system it becomes desirable to implement an ARQ protocol so that messages or message fragments received in error can be re-transmitted. The invention provides an ARQ protocol that is suitable for an asymmetrical system in which all control for transceiver transmissions resides in the system controlled. The ARQ methodology represented in the invention minimizes the memory and processing requirements of the transceivers. It also provides the tools necessary for the system to implement scheduled reverse channel frequency reuse within the same forward channel simulcast zones.

Because reverse channel messages are "self-contained" and because the system can determine what receivers the transceiver is closest to, the tools are provided to implement scheduled reverse channel frequency reuse with multiple transceivers within a single forward channel simulcast zone with this ARQ scheme.

The ARQ scheme of the invention provides the tools necessary for the system to re-establish communication if message synchronization is lost or other errors occur. The scheme is asymmetrical in that all communications between the system and the transceiver are completely controlled by the system. The burden of tracking message numbers and maintaining synchronization of the messaging process has been placed completely with the system.

When implementing a two-way selective call system, it is necessary to provide an acknowledgment for each reverse channel message or message fragment. However acknowledgment vectors on the forward channel consume precious bandwidth and increase message delay. The invention consumes less forward channel bandwidth and reduces message delay caused by the acknowledgment cycle of twoway messaging. When a transceiver is scheduled (by the system) to transmit a message or message fragment on the reverse channel, the system later provides an acknowledgment signal to the transceiver as an indication of whether or not the message (or message fragment) was received correctly. Those messages (or message fragments) that are received in error are rescheduled by the system for later re-transmission by the transceiver. To conserve channel bandwidth and minimize message delay, it is desirable to combine the acknowledgments (which are delivered by the system on the forward channel) for several reverse channel messages (or message fragments) into a single transmission addressed to the transceiver. In the ReFlex50 protocol, this is implemented by assigning to each reverse channel message (or message fragment also known as a data unit) a sequential ID number and/or a signature number. There is a predetermined one-to-one correspondence between a message's (or message fragment's) ID number and an associated bit position within a single forward channel page or vector delivered by the system to transceiver. The single forward channel page (or vector) provides the acknowledgment for multiple reverse channel messages (or message fragments). The default position for all "ACK bits" within the forward channel vector is "logical 0". As reverse channel messages (or message fragments) are received correctly, the system sets each associated ACK bit within the forward channel vector to a "logical 1". When it is time to transmit the ACK vector, reverse channel message fragments that were received in error or those that were missed on the channel will have their associated ACK bits set to logical 0. The transceiver then prepares to re-transmit the messages (or message fragments) that were signaled to be received in error or missed by the system. Because only one forward channel vector is delivered for multiple reverse channel messages or message fragments, (i.e., a group), less forward channel bandwidth is consumed and ACK feedback delay is minimized. Allowing a single forward channel message (or vector) to provide acknowledgment feedback for multiple reverse channel messages (or message fragments) produces the improvement. Providing for a predetermined one-to-one correspondence between reverse channel message (or message fragment) ID and or signature numbers and bit positions within a field of bits on a forward channel acknowledgment vector also enabled the improvement. The invention includes the method of receiving a signal containing at least one data unit of the group and an assigned identification code of the at least one data unit; decoding the signal to separately extract message information from each of the at least one data unit of the group; and in response to successful decoding of message information, transmitting one data signal (e.g., Command to PMU vector) containing information to separately confirm successful decoding of message information from each of the at least one data unit of the group.

While a detailed description of the preferred embodiment has been given, it should be appreciated that many variations can be made thereto without departing from the scope of the invention as set forth in the claims.

We claim:

1. A system controlled asymmetrical automatic repeat request protocol method in a two-way wireless communication system, the two-way wireless communication system having a controller coupled to at least one transmitter and to at least one receiver for communication of a message from at least one selective call transceiver, the message having a length and the message divided into a plurality of packets, each packet transmitted during a time slot, comprising the steps of:

receiving a reservation request signal from the at least one selective call transceiver, the reservation request signal including a measure of the length of the message; and in response to the measure of the length of the message, the controller determining a total number of data units into which to divide the message for subsequent transmission by the at least one selective call transceiver, each data unit comprising at least one packet, the data unit being the smallest parcel of scheduled transmitted data that is acknowledgeable by the system.

2. The method of claim 1 in which each data unit comprises at least one packet containing at least a portion of one data unit of the plurality of data units, and in which the controller determines a quality of the reservation request signal, and in response to the quality of the reservation request signal, determines a packet size of each of the at least one packet.

3. The method of claim 2 including the additional step of transmitting a first signal to the at least one selective call transceiver, the first signal containing at least information identifying a group of two or more of data units of the total number of data units, the number of data units in the group being equal to or less than the total number of data units in the message, and a start time of transmission of the group of data units by the at least one selective call transceiver.

4. The method of claim 3 in which each data unit of the group is individually identified by an identification code assigned to each data unit, and comprising the additional steps of:

receiving from the at least one selective call transceiver a signal containing at least one data unit of the group and an assigned identification code of the at least one data unit;

decoding at the controller the signal to separately extract message information from each of the at least one data unit of the group; and in response to successful decoding of message information, transmitting to the at least one selective call transceiver one data signal containing information to separately confirm successful decoding of message information from each of the at least one data unit of the group.

5. The method of claim 4 in which the signal contains one start address unit.

6. The method of claim 4 including the additional step of:

transmitting a second signal to the at least one selective call transceiver containing information identifying a subsequent group of two or more data units of the total number of data units for subsequent transmission by the at least one selective call transceiver and specifying a start time of transmission of the subsequent group by the at least one selective call transceiver.

7. The method of claim 6 in which data units of the subsequent group are not successfully decoded.

8. In a selective call transceiver, a method of transmitting a message, the message dividable into a plurality of data units, each of the plurality of data units having at least one packet, the message having a length, comprising the steps of:

transmitting a signal containing at least a measure of the length of the message;

receiving a reservation signal containing information representing at least a number of data units into which to divide the message and a packet size for the at least one packet; and in response to receiving the reservation signal,
assigning an identification code from among a plurality of available reusable identification codes to each of the plurality of data units, and transmitting at least part of the message containing at least one data unit and an assigned identification code of the at least one data unit.

9. The method of claim 8 in which a selective number of data units of the message are re-transmitted, comprising the additional steps of:

receiving a data signal having a plurality of predetermined bit positions, each predetermined bit position of the plurality of predetermined bit positions corresponding to one assigned identification code of the plurality of available reusable identification codes; and in response to a bit value at each of the plurality of predetermined bit positions, selectively re-transmitting an automatic repeat signal containing at least the data unit having the one assigned identification code corresponding to a one bit position of the plurality of predetermined bit positions, the automatic repeat signal also containing the one assigned identification code.

\* \* \* \* \*